US012730966B2

(12) United States Patent
Liu et al.

(10) Patent No.: US 12,730,966 B2
(45) Date of Patent: Sep. 8, 2026

(54) MACHINE LEARNING TECHNIQUES FOR PREDICTING AND RANKING TYPEAHEAD QUERY SUGGESTION KEYWORDS BASED ON USER CLICK FEEDBACK

(71) Applicant: Optum, Inc., Minnetonka, MN (US)

(72) Inventors: Chenwei Liu, Rockville, MD (US); Xianshi Wei, Bayside, NY (US); Ayush Tomar, Morgan Hill, CA (US); Vinit Garg, Fremont, CA (US)

(73) Assignee: Optum, Inc., Minnetonka, MN (US)

( * ) Notice: Subject to any disclaimer, the term of this patent is extended or adjusted under 35 U.S.C. 154(b) by 149 days.

(21) Appl. No.: 18/527,910

(22) Filed: Dec. 4, 2023

(65) Prior Publication Data

US 2025/0181611 A1 Jun. 5, 2025

(51) Int. Cl.
*G06F 40/274* (2020.01)
*G06F 16/332* (2019.01)

(52) U.S. Cl.
CPC ........ *G06F 40/274* (2020.01); *G06F 16/3322* (2019.01)

(58) Field of Classification Search
CPC ..................................................... G06F 40/274
See application file for complete search history.

(56) References Cited

U.S. PATENT DOCUMENTS 6,182,068 B1 1/2001 Culliss
6,564,213 B1 5/2003 Ortega et al.
6,738,754 B1 5/2004 Norman, Jr.
7,548,910 B1 6/2009 Chu et al.
7,657,522 B1 2/2010 Puzicha et al.
7,933,859 B1 4/2011 Puzicha et al.
8,100,829 B2 1/2012 Rothman et al.
8,312,138 B2 11/2012 Hull et al.
(Continued)

FOREIGN PATENT DOCUMENTS

AU 2015324030 A1 4/2017
CA 2816517 A1 4/2012
(Continued)

OTHER PUBLICATIONS

Final Rejection Mailed on Mar. 17, 2025 for U.S. Appl. No. 18/520,662, 12 page(s).
(Continued)

*Primary Examiner* — Douglas Godbold
(74) *Attorney, Agent, or Firm* — Alston & Bird LLP

(57) ABSTRACT

Various embodiments of the present disclosure provide methods, apparatus, systems, computing devices, computing entities, and/or the like for providing suggestion keywords based on historical search data of a user by: generating one or more keyword feature vectors associated with a plurality of keywords from a list of suggestion keywords, generating one or more personalized feature vectors associated with the user based on search session data, generating a plurality of predictions of the user selecting the plurality of keywords based on the one or more keyword feature vectors and the one or more personalized feature vectors, assigning a plurality of rankings to the plurality of keywords based on the plurality of prediction probabilities, and generating one or more typeahead suggestion keywords based on the plurality of rankings.

18 Claims, 8 Drawing Sheets

(56) References Cited

U.S. PATENT DOCUMENTS 8,392,207 B2 3/2013 Olaniyan
8,403,847 B2 3/2013 Rothman et al.
8,583,450 B2 11/2013 Baker et al.
8,620,842 B1 12/2013 Cormack
8,706,530 B2 4/2014 Ohnemus et al.
8,793,252 B2 7/2014 Subasic et al.
8,972,397 B2 3/2015 Imig et al.
8,996,314 B2 3/2015 Ohnemus et al.
9,058,327 B1 6/2015 Lehrman et al.
9,424,532 B1 8/2016 Abedini et al.
9,436,760 B1 9/2016 Tacchi et al.
9,460,214 B2 10/2016 Vuong et al.
9,471,709 B1 10/2016 Zinenko et al.
9,977,866 B2 5/2018 Norris et al.
10,026,114 B2 7/2018 Tolvanen et al.
10,062,039 B1 8/2018 Lockett
10,176,541 B2 1/2019 Chaudhri et al.
10,262,384 B1 4/2019 Albro et al.
10,380,210 B1 8/2019 Lai et al.
10,394,894 B2 * 8/2019 Garg .................... G06F 16/951
10,409,874 B2 9/2019 Cheng
10,413,779 B2 9/2019 Ingram et al.
10,438,291 B1 10/2019 Neben et al.
10,489,440 B2 11/2019 Sharma et al.
10,546,001 B1 1/2020 Nguyen et al.
10,664,527 B1 5/2020 Henderson et al.
10,770,184 B1 9/2020 Mcnair
10,789,309 B1 9/2020 Bousquet et al.
10,803,241 B2 10/2020 Weisman et al.
10,943,072 B1 3/2021 Jaganmohan
10,943,178 B1 3/2021 Gao et al.
10,977,254 B2 4/2021 Claussenelias et al.
11,004,135 B1 5/2021 Sandler et al.
11,055,324 B1 7/2021 Inoue et al.
11,137,977 B2 * 10/2021 Weinstein .............. G06F 9/451
11,238,113 B2 2/2022 Freese et al.
11,276,089 B1 3/2022 Salehie et al.
11,308,538 B1 4/2022 Pineau
11,366,966 B1 6/2022 Ramsey et al.
11,416,535 B2 8/2022 Counts et al.
11,527,326 B2 12/2022 Mcnair et al.
11,636,949 B2 4/2023 Goldberg et al.
11,748,413 B1 * 9/2023 Yoon ................. G06Q 30/0623 707/730
11,775,989 B1 10/2023 Hao et al.
11,940,986 B1 3/2024 Kocaman et al.
12,080,398 B2 9/2024 Nida et al.
2002/0103680 A1 8/2002 Newman
2003/0163349 A1 8/2003 Ho
2004/0019601 A1 1/2004 Gates
2004/0073538 A1 4/2004 Leishman et al.
2005/0060194 A1 3/2005 Brown
2005/0075931 A1 4/2005 Pearson
2005/0080786 A1 4/2005 Fish et al.
2005/0165627 A1 7/2005 Fotsch et al.
2006/0206264 A1 9/2006 Rasmussen
2008/0133272 A1 6/2008 Marshall
2008/0313119 A1 12/2008 Leskovec et al.
2009/0132573 A1 5/2009 Reed, Jr. et al.
2009/0254402 A1 10/2009 Beall
2009/0281719 A1 11/2009 Jakobson
2009/0292555 A1 11/2009 Brown
2010/0063846 A1 3/2010 Shakamuri
2010/0076786 A1 3/2010 Dalton et al.
2010/0131482 A1 5/2010 Linthicum et al.
2010/0131498 A1 5/2010 Linthicum et al.
2010/0179839 A1 7/2010 Collins et al.
2010/0198857 A1 8/2010 Metzler et al.
2011/0077973 A1 3/2011 Breitenstein et al.
2011/0161110 A1 6/2011 Mault
2011/0264513 A1 10/2011 Ratnaparkhi
2012/0089413 A1 4/2012 Balassanian
2012/0296455 A1 11/2012 Ohnemus et al.
2013/0024474 A1 1/2013 Kraft et al.
2013/0073686 A1 3/2013 Sandholm
2013/0211858 A1 8/2013 Ohnemus et al.
2013/0232006 A1 9/2013 Holcomb et al.
2013/0290321 A1 10/2013 Shapira et al.
2013/0325319 A1 12/2013 Moore et al.
2014/0067423 A1 3/2014 Joao
2014/0088986 A1 3/2014 Gowdy et al.
2014/0100860 A1 4/2014 Stollmeyer et al.
2014/0129493 A1 5/2014 Leopold
2014/0156308 A1 6/2014 Ohnemus et al.
2014/0280039 A1 9/2014 Bach
2014/0280289 A1 9/2014 Marantz et al.
2014/0310013 A1 10/2014 Ram et al.
2014/0316811 A1 10/2014 Ohnemus et al.
2014/0372133 A1 12/2014 Austrum et al.
2014/0372421 A1 12/2014 Seacat et al.
2014/0379755 A1 12/2014 Kuriakose et al.
2015/0234987 A1 8/2015 Laing et al.
2015/0331878 A1 11/2015 Joseph et al.
2016/0048646 A1 2/2016 Stover et al.
2016/0078101 A1 3/2016 Somaiya et al.
2016/0085799 A1 3/2016 Kim et al.
2016/0092598 A1 3/2016 Mishra
2016/0110826 A1 4/2016 Morimoto et al.
2016/0140125 A1 * 5/2016 Goyal .................... G06N 20/00 707/751
2016/0188619 A1 * 6/2016 Su ....................... G06F 16/3322 707/728
2017/0097939 A1 4/2017 Zhu et al.
2017/0109355 A1 4/2017 Li et al.
2017/0123618 A1 5/2017 Porcella
2017/0249713 A1 8/2017 Serbinis et al.
2017/0270115 A1 9/2017 Cormack et al.
2017/0293923 A1 10/2017 Margolis et al.
2017/0308583 A1 * 10/2017 Husain ................ G06F 16/9024
2018/0025334 A1 1/2018 Pourfallah et al.
2018/0082030 A1 3/2018 Allen et al.
2018/0165288 A1 6/2018 Chang et al.
2018/0341875 A1 11/2018 Carr
2019/0005409 A1 1/2019 Doshi et al.
2019/0108228 A1 4/2019 Zeng et al.
2019/0163679 A1 5/2019 Srinivasa et al.
2019/0171728 A1 6/2019 Wakankar et al.
2019/0188251 A1 6/2019 Liu et al.
2019/0228038 A1 7/2019 Mishra
2019/0325031 A1 10/2019 Puzicha
2019/0325864 A1 * 10/2019 Anders ................... G10L 15/19
2019/0347323 A1 11/2019 Riesa et al.
2019/0370393 A1 * 12/2019 Finch ....................... G06N 3/08
2020/0005149 A1 1/2020 Ramanath et al.
2020/0073953 A1 3/2020 Kulkarni
2020/0092695 A1 3/2020 Vigeant et al.
2020/0104395 A1 4/2020 Bhatia et al.
2020/0279641 A1 9/2020 Nida et al.
2020/0320139 A1 10/2020 Duishoev et al.
2020/0342010 A1 10/2020 Rosomoff
2020/0350072 A1 11/2020 Mcewing et al.
2020/0365259 A1 11/2020 Chmait et al.
2020/0388402 A1 12/2020 Frey et al.
2020/0411146 A1 12/2020 Mcewing et al.
2021/0019374 A1 1/2021 Donaldson et al.
2021/0027870 A1 1/2021 West
2021/0141860 A1 5/2021 Karagiannis et al.
2021/0158144 A1 * 5/2021 Coulombe ........... G06N 3/0895
2021/0174164 A1 * 6/2021 Hsieh ................ G06F 16/24578
2021/0209095 A1 7/2021 Gallant
2021/0241204 A1 8/2021 Stein
2021/0295822 A1 9/2021 Tomkins et al.
2021/0319520 A1 10/2021 Winters
2021/0357187 A1 * 11/2021 Clement ................... G06F 8/35
2021/0398077 A1 12/2021 Lomurray et al.
2022/0005566 A1 1/2022 Lyman et al.
2022/0035867 A1 2/2022 Tambi et al.
2022/0035869 A1 2/2022 Beck et al.
2022/0067841 A1 3/2022 Hanson
2022/0179892 A1 6/2022 Kermode et al.
2022/0198573 A1 6/2022 Brown et al.
2022/0245162 A1 8/2022 Wang et al.
2022/0384052 A1 12/2022 Gnanasambandam et al.
2022/0405476 A1 * 12/2022 Sar Shalom .......... G06F 40/289

(56) References Cited

U.S. PATENT DOCUMENTS

2022/0405590 A1 12/2022 Hebets
2023/0138014 A1 5/2023 Sebastian
2023/0170092 A1 6/2023 Moon et al.
2023/0229706 A1* 7/2023 Zheng ................ G06F 16/9535 707/727
2023/0252338 A1 8/2023 Ayyadevara et al.
2023/0283987 A1 9/2023 Cheng et al.
2023/0289524 A1* 9/2023 Prasad ................ G06F 40/284
2023/0359441 A1* 11/2023 Duan ..................... G06N 3/084
2023/0368130 A1 11/2023 Sheshansh et al.
2023/0394040 A1 12/2023 Gupta et al.
2023/0409614 A1* 12/2023 Hamilton ............ G06F 16/9024
2024/0054326 A1 2/2024 Dave et al.
2024/0070693 A1 2/2024 Neumann
2024/0248901 A1 7/2024 Krishnan et al.
2024/0265431 A1 8/2024 Jimnez et al.
2024/0289361 A1 8/2024 Batina et al.
2024/0386330 A1 11/2024 Ajmera et al.
2024/0386454 A1 11/2024 Bahnsen et al.
2024/0428315 A1 12/2024 Rao et al.
2025/0166037 A1 5/2025 Maschmeyer et al.

FOREIGN PATENT DOCUMENTS

CA 2836381 A1 11/2012
CA 2841006 A1 1/2013
CN 103329135 A 9/2013
CN 107665217 A 2/2018
CN 108304439 B 7/2021
EP 2622568 A1 8/2013
EP 2710503 A1 3/2014
EP 2729912 A1 5/2014
EP 3156949 A2 4/2017
IN 201941028487 A 1/2021
WO 2012/050969 A1 4/2012
WO 2012/156374 A1 11/2012
WO 2013/004706 A1 1/2013
WO 2014/087252 A2 6/2014
WO 2023/278037 A1 1/2023

OTHER PUBLICATIONS

Final Rejection Mailed on Sep. 13, 2024 for U.S. Appl. No. 17/934,688, 20 page(s).

Non-Final Rejection Mailed on Feb. 4, 2025 for U.S. Appl. No. 18/500,664, 40 page(s).

Non-Final Rejection Mailed on Feb. 10, 2025 for U.S. Appl. No. 17/934,688, 24 page(s).

Non-Final Rejection Mailed on Sep. 10, 2024 for U.S. Appl. No. 18/520,662, 17 page(s).

Non-Final Rejection Mailed on Sep. 20, 2024 for U.S. Appl. No. 18/047,209, 46 page(s).

Notice of Allowance and Fees Due (PTOL-85) Mailed on Sep. 26, 2024 for U.S. Appl. No. 18/416,276, 10 page(s).

"Semantic Textual Similarity," SBERT.net, (2 pages), (2024), [retrieved from the Internet Sep. 13, 2024] <URL: https://www.sbert.net/examples/training/sts/README.html>.

Alla, Samhita. "A Guide To Bidirectional RNNs With Keras," Paperspace Blog, (2020), (11 pages), (article, online), [retrieved from the Internet Sep. 13, 2024] <URL: https://blog.paperspace.com/bidirectional-rnn-keras/#:~:text=A%20Bidirectional%20RNN%20is%20a,the%20beginning%20of%20a%20sequence>.

Bern, Erik. "Spotify/Annoy: Approximate Nearest Neighbors In C++/Python Optimized For Memory Usage and Loading/Saving To Disk," GitHub, Apr. 10, 2023, (8 pages), [retrieved from the Internet Sep. 13, 2024] <URL: https://github.com/spotify/annoy>.

Briggs, James. "BERT For Next Sentence Prediction," Towards Data Science, May 25, 2021, (7 pages), (article, online) [retrieved from the Internet Sep. 13, 2024] <URL: https://towardsdatascience.com/bert-for-next-sentence-prediction-466b67f8226f>.

Coates, Dustin. "How NLP & NLU Work For Semantic Search," Search Engine Journal, Apr. 25, 2022, (15 pages), [retrieved from the Internet Sep. 11, 2024] <URL: https://www.searchenginejournal.com/nlp-nlu-semantic-search/444694/>.

Corrected Notice of Allowance and Fees Due (PTOL-85), Sep. 12, 2024, U.S. Appl. No. 18/484,943, (4 pages).

Doshi, Sanket. "Skip-Gram: NLP Context Words Prediction Algorithm," Towards Data Science, Mar. 16, 2019, (12 pages), (article, online), [retrieved from the Internet Sep. 13, 2024] <URL: https://towardsdatascience.com/skip-gram-nlp-context-words-prediction-algorithm-5bbf34f84e0c>.

Final Office Action for U.S. Appl. No. 17/934,688, dated Sep. 13, 2024, (20 pages), U.S. Patent and Trademark Office, US.

NonFinal Office Action for U.S. Appl. No. 18/520,662, filed Sep. 10, 2024, (17 pages), U.S. Patent and Trademark Office, US.

Notice of Allowance and Fees Due (PTOL-85) Mailed on Aug. 23, 2024 for U.S. Appl. No. 18/484,943, 14 page(s).

Yan, et al., "A Survey of Automated International Classification of Diseases Coding: Development, Challenges, and Applications", Intelligent Medicine, vol. 2, pp. 161-173, Mar. 11, 2022, https://doi.org/10.1016/j.imed.2022.03.003.

"Clinical Management Guidelines for Obstetrician-Gynecologists", The American College Of Obstetricians and Gynecologists Practice Bulletin, No. 109, Dec. 2009, pp. 1-12.

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

Bao, et al., "Medical Code Prediction via Capsule Networks and ICD Knowledge", BMC Medical Informatics and Decision Making, vol. 21 (Suppl. 2):55, Jul. 30, 2021, (12 pages), doi.org/10.1186/s12911-021-01426-9.

Chapelle, Olivier et al. "A Dynamic Bayesian Network Click Model For Web Search Ranking," In Proceedings of the 18th International Conference On World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Dao, Tien Tuan et al. "Knowledge-Based Personalized Search Engine For The Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Galli, Keith. Galli K. "High-Performance Intent Classification In Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction For Personal Search," In Proceedings of the 2019 World Wide Web Conference (WWW'19), May 13-17, 2019, (7 pages), DOI: 10.1145/3308558.3313706.

Hwang, Sewoong et al. "Toward A Chatbot For Financial Sustainability," Sustainability, vol. 13, No. 6:3173, Mar. 13, 2021, pp. 1-18, DOI: 10.3390/su13063173.

International Search Report and Written Opinion for International Application No. PCT/US2023/015396, dated Jun. 19, 2023, (13 pages), European Patent Office, Rijswijk, Netherlands.

Lemoine, Julien, et al., "Predictive Search and Autocomplete", Algolia Blog, (14 pages), Dec. 6, 2022, Retrieved from the Internet https://web.archive.org/web/20221206165729/https://www.algolia.com/blog/ai/predictive-search-and-autocomplete/.

Li, Jianqiang et al. "Diversity-Aware Retrieval Of Medical Records," Computers In Industry, vol. 29, pp. 81-91, May 2015, DOI: http://dx.doi.org/10.1016/j.compind.2014.09.004.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Miller, Alissa S. et al. "Improving Stage Of Change In An Employee Wellness Program," Workplace Health & Safety, vol. 67, No. 8, pp. 381-290, Aug. 2019, DOI: 10.1177/2165079919838291.

(56) References Cited

OTHER PUBLICATIONS

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.
Non-Final Rejection Mailed on Feb. 26, 2024 for U.S. Appl. No. 17/971,491, 11 page(s).
Non-Final Rejection Mailed on Mar. 13, 2024 for U.S. Appl. No. 17/934,688, 20 page(s).
Perrault, Evan K. et al. "Employees' Refusals To Participate In An Employer-Sponsored Wellness Program: Barriers and Benefits To Engagement," Compensation & Benefits Review, vol. 52, No. 1, p. 8-18, Jan. 2020, DOI: 10.1177/0886368719899209.
Sun, Xu et al. "Feature-Frequency-Adaptive On-Line Training For Fast and Accurate Natural Language Processing," Computational Linguistics, vol. 40, No. 3, pp. 563-586, Sep. 1, 2014, DOI: 10.1162/COLL_a_00193.
U.S. Provisional Patent Application, "Automated Health Data Acquisition, Processing And Communication System", Unpublished (filed Nov. 30, 2012), (Peter Ohnemus, Inventor), 98 pages, U.S.A., U.S. Appl. No. 61/732,203.
U.S. Provisional Patent Application, "Health Data Acquisition, Processing and Communication System", Unpublished (filed Jun. 9, 2011), (Peter Ohnemus, Inventor), 50 pages, U.S.A., U.S. Appl. No. 61/495,247.
U.S. Provisional Patent Application, "Health Data Acquisition, Processing and Communication System", Unpublished (filed Sep. 29, 2010), (Peter Ohnemus, Inventor), 31 pages, U.S.A., U.S. Appl. No. 61/387,906.
U.S. Provisional Patent Application, "System And Method For Personal Energy Expenditure Analyses", Unpublished (filed May 16, 2011), (Peter Ohnemus, Inventor), 35 pages, U.S.A., U.S. Appl. No. 61/486,658.
Wu, Qiang et al. "Adapting Boosting For Information Retrieval Measures," Learning To Rank For Information Retrieval, vol. 13, pp. 254-270, Jun. 2010, DOI: https://citeseerx.ist.psu.edu/viewdoc/download?doi=10.1.1.157.5117&rep=rep1&type=pdf.
Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using-extreme-multi-label-ranking.pdf.
Final Rejection Mailed on Oct. 22, 2025 for U.S. Appl. No. 18/583,102, 21 page(s).
Non-Final Rejection Mailed on Nov. 3, 2025 for U.S. Appl. No. 18/047,209, 34 page(s).
Non-Final Rejection Mailed on Oct. 28, 2025 for U.S. Appl. No. 18/500,664, 22 page(s).
Notice of Allowance and Fees Due (PTOL-85) Mailed on Sep. 30, 2025 for U.S. Appl. No. 18/390,940, 9 page (s).
Advisory Action (PTOL-303) Mailed on May 28, 2025 for U.S. Appl. No. 18/520,662, 3 page(s).
Final Rejection Mailed on Apr. 24, 2025 for U.S. Appl. No. 18/047,209, 50 page(s).
Final Rejection Mailed on Jul. 8, 2025 for U.S. Appl. No. 18/500,664, 21 page(s).
Gupta, Prabhakar , "A Context-Sensitive Real-Time Spell Checker with Language Adaptability", IEEE, (Year: 2020), 7 pages.
Hienert, et al., "A Novel Combined Term Suggestion Service for Domain-Specific Digital Libraries", 12 pages, (Year: 2011).
Jalali, et al., "The Effect of Using Domain Specific Ontologies in Query Expansion in Medical Field", IEEE, (Year: 2008), 5 pages.
Non-Final Rejection Mailed on Jun. 16, 2025 for U.S. Appl. No. 18/520,662, 11 page(s).
Non-Final Rejection Mailed on Jun. 17, 2025 for U.S. Appl. No. 18/434,959, 15 page(s).
Non-Final Rejection Mailed on May 6, 2025 for U.S. Appl. No. 18/390,940, 11 page(s).
Non-Final Rejection Mailed on May 8, 2025 for U.S. Appl. No. 18/583,102, 18 page(s).
Notice of Allowance and Fees Due (PTOL-85) Mailed on Aug. 8, 2025 for U.S. Appl. No. 18/980,819, 10 page (s).
Notice of Allowance and Fees Due (PTOL-85) Mailed on Jul. 9, 2025 for U.S. Appl. No. 17/934,688, 20 page (s).
Soualmia, et al., "The Effect of Using Domain Specific Ontologies in Query Expansion in Medical Field", BMC Bioinformatics, vol. 13, suppl. 14, (15 pages), 2012.
Final Rejection Mailed on Dec. 2, 2025 for U.S. Appl. No. 18/434,959, 30 page(s).
Final Rejection Mailed on Dec. 17, 2025 for U.S. Appl. No. 18/520,662, 12 page(s).
Final Rejection Mailed on Feb. 23, 2026 for U.S. Appl. No. 18/500,664, 24 page(s).
Notice of Allowance and Fees Due (PTOL-85) Mailed on Feb. 3, 2026 for U.S. Appl. No. 18/583,102, 10 page(s).
Final Rejection Mailed on May 28, 2026 for U.S. Appl. No. 18/047,209, 38 page(s).
Non-Final Rejection Mailed on Apr. 20, 2026 for U.S. Appl. No. 18/588,776, 34 page(s).
Non-Final Rejection Mailed on Jun. 1, 2026 for U.S. Appl. No. 18/520,662, 12 page(s).
Non-Final Rejection Mailed on Mar. 25, 2026 for U.S. Appl. No. 18/434,959, 31 page(s).
Non-Final Rejection Mailed on May 6, 2026 for U.S. Appl. No. 18/500,664, 26 page(s).

* cited by examiner

MACHINE LEARNING TECHNIQUES FOR PREDICTING AND RANKING TYPEAHEAD QUERY SUGGESTION KEYWORDS BASED ON USER CLICK FEEDBACK

BACKGROUND

Various embodiments of the present disclosure address technical challenges related to predictive text analysis and provide solutions to address the efficiency and reliability shortcomings of existing predictive text analysis solutions.

Providing a user-friendly search experience may rely on good keyword suggestion algorithms, such as when searching for healthcare providers, as many medical-related terms are not easy to type, and many medical search intentions are not easy to phrase accurately. A typical search user interface may comprise limited space to display suggestions and combined with a narrow user attention span, it may be necessary and beneficial to provide querying users with most relevant keywords from an extensive list of potentially relevant keywords as search query suggestions. For example, an information retrieval system may provide typeahead suggestion keywords (also known as "autocomplete") to quicken or simplify the process of retrieving information by predicting a word a user intends to enter after a few characters or a portion of a complete term have been typed into a text input field. Typeahead suggestion keywords may also reduce mistypes or spelling errors thereby providing more relevant terms to search engines which may improve overall search results and reduce null results (no results).

However, traditional typeahead suggestion keyword implementations are generic in nature, intended for use by a broader population, and are agnostic to personalized activities or behaviors. As such, traditional typeahead suggestion keywords are oblivious to prior search activities that may reflect a current query intention. Thus, there is a need for analyzing and incorporating user-specific search activities into keyword ranking for generating typeahead suggestion keywords to help users type more accurate search terms that are reflective of their query intentions.

Various embodiments of the present disclosure make important contributions to traditional keyword suggestion techniques by addressing these technical challenges, among others.

BRIEF SUMMARY

In general, various embodiments of the present disclosure provide methods, apparatus, systems, computing devices, computing entities, and/or the like for generating and surfacing improved keyword suggestions.

Various embodiments of the present disclosure make important technical contributions to improving the predictive accuracy of predictive machine learning models used in generating suggestion keywords for search queries by generating predictions on a plurality of keywords in lists of suggestion keywords based on a plurality of keyword feature vectors associated with the plurality of keywords and one or more personalized feature vectors of a specific user. As described herein, identifying user query intention and assisting users in typing more accurate search terms, such as by suggesting keywords, may facilitate and improve information retrieval quality. Accordingly, by helping a user form more relevant search terms, the techniques described herein improve embeddings for incorporating personalized relevancy by merging features of keywords and user search activities, leading to higher accuracy of performing predictive operations as needed on generating suggestion keywords, such as typeahead suggestion keywords.

In some embodiments, a computer-implemented method comprises receiving, by one or more processors, a list of suggestion keywords that comprises a plurality of keywords associated with a word prefix; generating, by the one or more processors, a plurality of keyword feature vectors associated with the plurality of keywords; generating, by the one or more processors, one or more personalized feature vectors based on search session data associated with a user; generating, by the one or more processors, a plurality of predictions on the plurality of keywords based on the plurality of keyword feature vectors and the one or more personalized feature vectors; assigning, by the one or more processors, a plurality of rankings to the plurality of keywords based on the plurality of predictions; and generating, by the one or more processors, one or more typeahead suggestion keywords, responsive to the word prefix received from the user, based on the plurality of rankings.

In some embodiments, a computing system comprising memory and one or more processors communicatively coupled to the memory, the one or more processors configured to receive a list of suggestion keywords that comprises a plurality of keywords associated with a word prefix; generate a plurality of keyword feature vectors associated with the plurality of keywords; generate one or more personalized feature vectors based on search session data associated with a user; generate a plurality of predictions on the plurality of keywords based on the plurality of keyword feature vectors and the one or more personalized feature vectors; assign a plurality of rankings to the plurality of keywords based on the plurality of predictions; and generate one or more typeahead suggestion keywords, responsive to the word prefix received from the user, based on the plurality of rankings.

In some embodiments, one or more non-transitory computer-readable storage media including instructions that, when executed by one or more processors, cause the one or more processors to receive a list of suggestion keywords that comprises a plurality of keywords associated with a word prefix; generate a plurality of keyword feature vectors associated with the plurality of keywords; generate one or more personalized feature vectors based on search session data associated with a user; generate a plurality of predictions on the plurality of keywords based on the plurality of keyword feature vectors and the one or more personalized feature vectors; assign a plurality of rankings to the plurality of keywords based on the plurality of predictions; and generate one or more typeahead suggestion keywords, responsive to the word prefix received from the user, based on the plurality of rankings.

DETAILED DESCRIPTION

Figure 1:
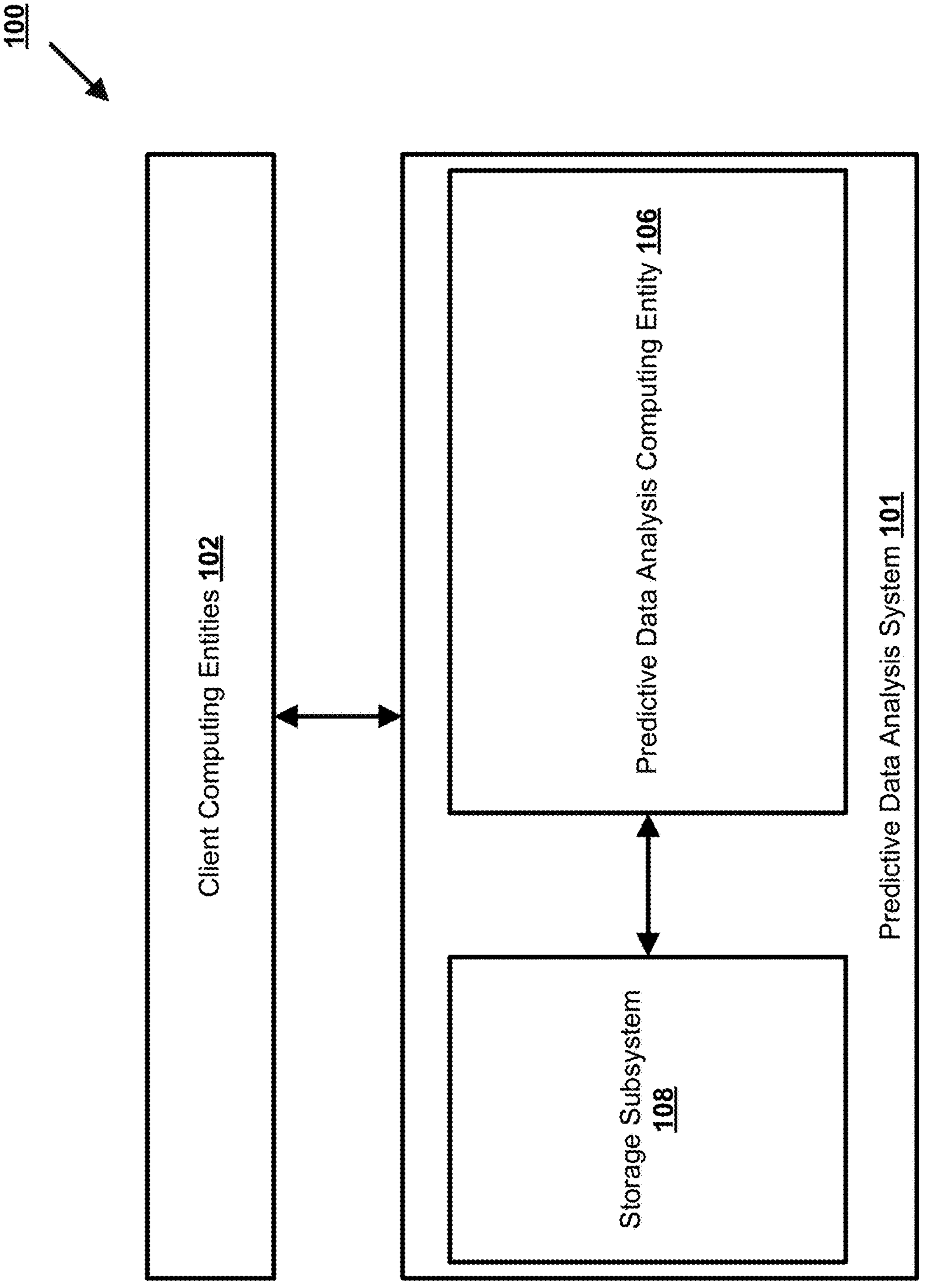
FIG. 1 provides an example overview of an architecture in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid-state drive (SSD), solid-state card (SSC), solid-state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 provides an example overview of an architecture 100 in accordance with some embodiments of the present disclosure. The architecture 100 includes a predictive data analysis system 101 configured to receive predictive data analysis requests and/or keyword suggestion requests from client computing entities 102, process the predictive data analysis requests and/or keyword suggestion requests to generate predictions and/or keyword rankings, and provide the generated predictions and/or selection of keywords based on the keyword rankings to the client computing entities 102. The example architecture 100 may be used in a plurality of domains and not limited to any specific application as disclosed herewith. The plurality of domains may include banking, healthcare, industrial, manufacturing, education, retail, to name a few.

In accordance with various embodiments of the present disclosure, a predictive machine learning model is trained to generate predictions on keywords based on keyword feature vectors and personalized feature vectors. The plurality of keyword feature vectors may be representative of keyword features in a list of suggestion keywords and the one or more personalized feature vectors may be representative of search session data reflecting user search behavior and user click information. Predictions on the keywords may be used to assign rankings to the keywords in one or more lists of suggestion keywords associated with respective one or more word prefixes such that the keywords may be selected from the one or more lists of suggestion keywords and provided as typeahead suggestion keywords in response to a user typing a word prefix matching the one or more prefixes. This technique will improve embeddings for incorporating personalized relevancy by merging features of keywords and user search activities, leading to higher accuracy of performing predictive operations as needed on generating suggestion keywords, such as typeahead suggestion keywords. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests and/or keyword suggestion requests from client computing entities 102, process the predictive data analysis requests and/or keyword suggestion requests to generate predictions and/or keyword rankings, and provide the generated predictions and/or selection of keywords based on the keyword rankings to the client computing entities 102.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example Predictive Data Analysis Computing Entity

Figure 2:
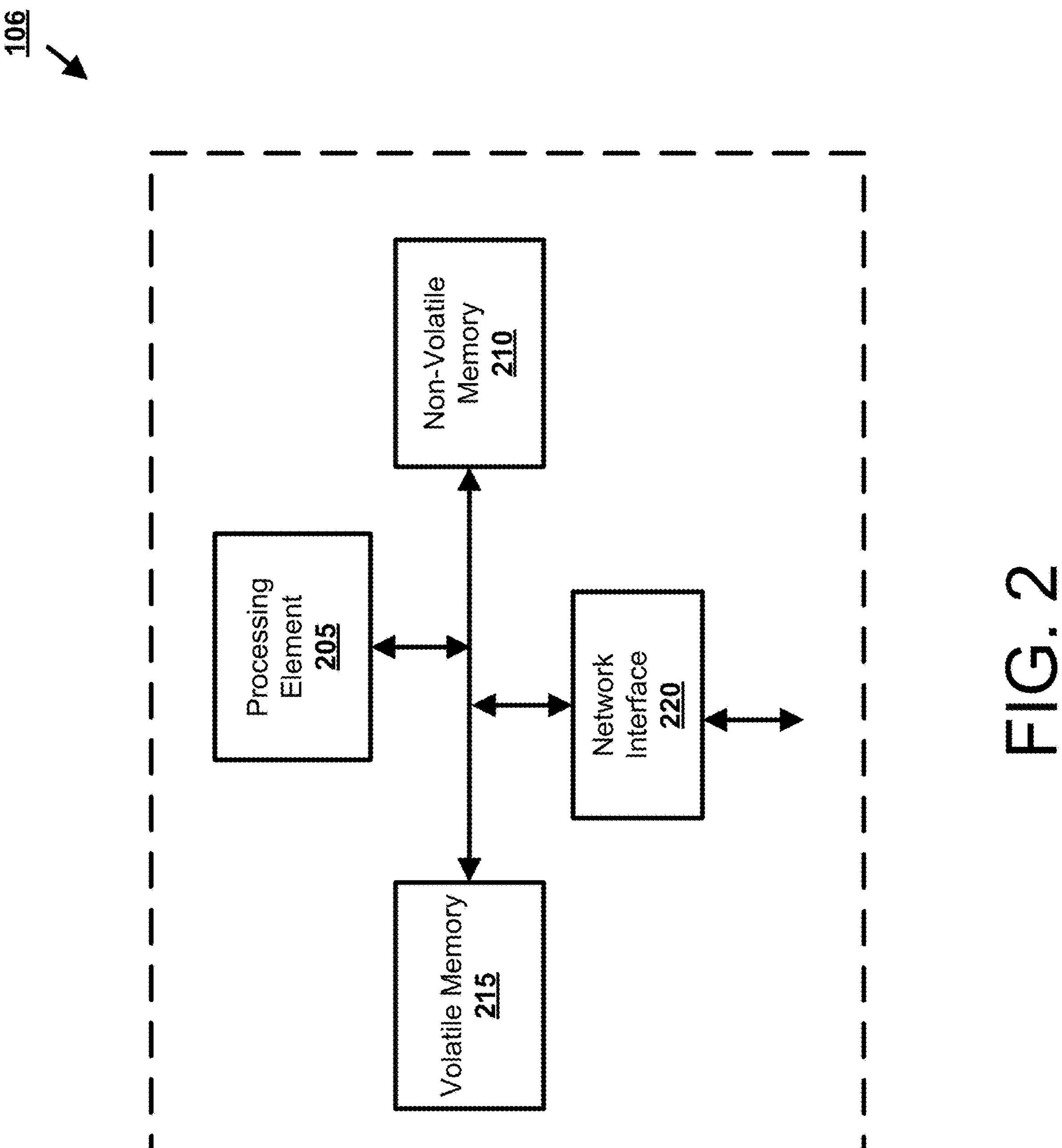
FIG. 2 provides an example predictive data analysis computing entity in accordance with some embodiments of the present disclosure.

FIG. 2 provides an example predictive data analysis computing entity 106 in accordance with some embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes may be performed on data, content, information, and/or similar terms used herein interchangeably.

As shown in FIG. 2, in some embodiments, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the predictive data analysis computing entity 106 may further include, or be in communication with, non-volatile media (also referred to as non-volatile storage, memory, memory storage, memory circuitry, and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the predictive data analysis computing entity 106 may further include, or be in communication with, volatile media (also referred to as volatile storage, memory, memory storage, memory circuitry, and/or similar terms used herein interchangeably). In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in some embodiments, the predictive data analysis computing entity 106 may also include one or more network interfaces 220 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Example Client Computing Entity

Figure 3:
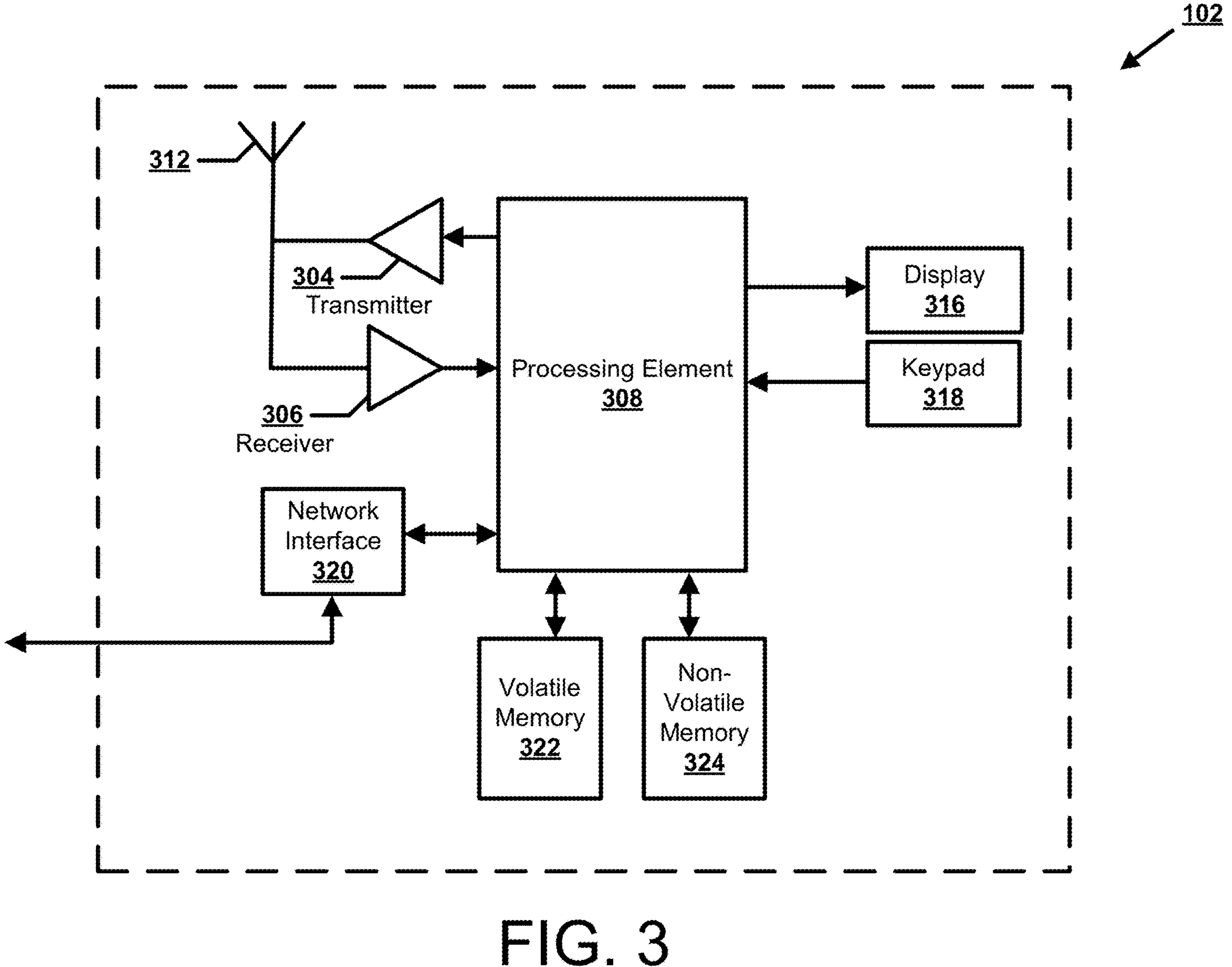
FIG. 3 provides an example client computing entity in accordance with some embodiments of the present disclosure.

FIG. 3 provides an example client computing entity in accordance with some embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 may be operated by various parties. As shown in FIG. 3, the client computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In some embodiments, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 may communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 may also download changes, add-ons, and updates, for instance, to its firmware, software (e.g., including executable instructions, applications, program modules), and operating system.

According to some embodiments, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the position of the client computing entity 102 in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The client computing entity 102 may also comprise a user interface (that may include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface may comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The client computing entity 102 may also include volatile memory 322 and/or non-volatile memory 324, which may be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory may store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the client computing entity 102 or accessible through a browser or other user interface for communicating with the predictive data analysis computing entity 106 and/or various other computing entities.

In another embodiment, the client computing entity 102 may include one or more components or functionalities that are the same or similar to those of the predictive data analysis computing entity 106, as described in greater detail above. As will be recognized, these architectures and descriptions are provided for example purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

III. EXAMPLES OF CERTAIN TERMS

In some embodiments, the term "list of suggestion keywords" refers to a data construct that describes a list of candidate keywords that may be selected and used to generate one or more typeahead suggestion keywords for a given word prefix. A list of suggestion keywords may comprise a plurality of keywords that are relevant to a specific word prefix or a specific sequence of characters. For example, a plurality of keywords from a given list of suggestion keywords may comprise a specific word prefix or a specific sequence of characters in the spelling of the plurality of keywords. In some embodiments, an information retrieval system may comprise one or more lists of suggestion keywords from which one or more keywords may be retrieved from appropriate ones of the one or more lists of suggestion keywords based on word prefixes received (e.g., typed by a user into a text input field) matching the one or more lists of suggestion keywords. In some embodiments, a list of suggestion keywords may be generated based on (i) a current version of an autocomplete list, (ii) a list of keywords generated based on overall frequency (e.g., most-frequently searched keywords), (iii) age or gender category, (iv) user clickstream (e.g., most-frequently clicked or selected), or (iv) a combination thereof. That is, a list of suggestion keywords may comprise a relatively expansive set of candidate keywords from which a subset of the candidate keywords may be selected to generate one or more typeahead suggestion keywords based on an assignment of rankings to the candidate keywords. In some embodiments, a list of suggestion keywords comprises a plurality of keywords that are associated with a respective plurality of initial rankings, where the plurality of keywords are re-ranked by modifying the plurality of initial rankings based on a prediction on each of the plurality of keywords generated by using a personalized re-ranking machine learning model.

In some embodiments, the term "keyword" refers to a data construct that describes a description of a concept comprising a term, word, or string of characters, numbers, symbols, or any combination thereof, that may be used in a search query to reference or indicate content for retrieval by an information retrieval system.

In some embodiments, the term "search query" refers to a data construct that describes a request for information. For example, a search query may comprise one or more words, terms, or a string of characters, numbers, symbols, or any combination thereof, that may be entered by a user and received by an information retrieval system, e.g., comprising a search engine. A search query may be used by an information retrieval system to match the search query with a corpus of content items or data objects for retrieval. According to various embodiments of the present disclosure, search queries may be received by a predictive data analysis system from one or more client computing entities, either directly or indirectly via, e.g., an information retrieval system comprising a search engine.

In some embodiments, the term "word prefix" refers to a data construct that describes a string of characters, numbers, symbols, or any combination thereof, that may be identified as comprising one or more leading characters or a portion of one or more potential keywords. For example, a word prefix may comprise a partially entered keyword. One or more candidate keywords may be retrieved from a list of suggestion keywords based on a partially entered keyword comprising a word prefix. According to various embodiments of the present disclosure, one or more typeahead suggestion keywords are generated responsive to an input word prefix received from a user (e.g., by an information retrieval system via a graphical user interface (GUI)) by selecting one or more of a plurality of keywords from one of one or more lists of suggestion keywords associated with the input word prefix based on rankings assigned to the selected one or more keywords.

In some embodiments, the term "typeahead suggestion keyword" refers to a data construct that describes a keyword that may be provided as a suggestion for completion of a word prefix entered by a user on a GUI of an information retrieval system. For example, one or more typeahead suggestion keywords may be generated based on rankings assigned to keywords associated with a word prefix that a user has provided thus far via a GUI of an information retrieval system. In some embodiments, rankings are assigned to keywords in one or more lists of suggestion keywords based on predictions on the keywords such that the keywords may be selected from the one or more lists of suggestion keywords to generate one or more typeahead suggestion keywords in response to receiving word prefixes associated with the one or more lists of suggestion keywords. One or more typeahead suggestion keywords may be rendered or presented to a user on a GUI of an information retrieval system while the user is typing (e.g., after a word prefix or a certain amount of characters, numbers, symbols, or any combination thereof, has been typed into a text input field). In some embodiments, typeahead suggestion keywords that have been generated and/or presented may be dynamically changed or be updated as the user is typing a keyword (e.g., to match typeahead suggestion keywords to user input). Typeahead suggestion keywords may be reviewed and accepted to complete or replace input received from a user by an information retrieval system, e.g., via a GUI. According to various embodiments of the present disclosure, keywords are suggested for querying an information retrieval system by (i) generating, using a personalized re-ranking machine learning model, a plurality of predictions on a plurality of keywords from a list of suggestion keywords based on a plurality of keyword feature vectors and one or more personalized feature vectors, (ii) assigning a plurality of rankings to the plurality of keywords based on the plurality of predictions, and (iii) generating one or more typeahead suggestion keywords, responsive to a word prefix received from a user, based on the plurality of rankings. In some embodiments, selecting the one or more of the plurality of keywords comprises determining one or more keywords comprising at least a minimum ranking from a list of suggestion keyword. In some embodiments, selecting the one or more of the plurality of keywords comprises selecting top ranking ones of the plurality of keywords (e.g., comprising the highest rankings) from the list of suggestion keywords. For example, a plurality of keywords from a list of suggestion keywords may be more than a target number of keywords to display to a user, and as such, a subset of the plurality of keywords may be selected for generating one or more typeahead suggestion keywords.

In some embodiments, the term "ranking" refers to a data construct that describes a rank, position, or order assigned to a member of a set of data elements, such as a keyword in a list of suggestion keywords, based on an evaluation or grading of the member relative to one or more other members within the set. In some embodiments, a ranking may be representative of relevancy or likelihood of a given user selecting a given keyword (relative to other keywords within a list of suggestion keywords) assigned the ranking. According to various embodiments of the present disclosure, a plurality of rankings are assigned to a plurality of keywords based on a plurality of predictions on the plurality of keywords. For example, a ranking may be assigned to a keyword in a list of suggestion keywords based on a prediction on the keyword by using a personalized re-ranking machine learning model.

In some embodiments, the term "initial ranking" refers to a data construct that describes a default or first ranking assigned to a member of a set, such as a keyword in a list of suggestion keywords. For example, an initial ranking may be assigned to a keyword in a list of suggestion keywords prior to generating a prediction on the keyword and assigning a ranking to the keyword based on the prediction. In some embodiments, an initial ranking may be assigned to each of a plurality of keywords in a list of suggestion keywords based on a weighted combination of one or more of overall search frequency, age, gender category, or user clickstream.

In some embodiments, the term "prediction" refers to a data construct that describes an output generated by an output layer of a machine learning model. According to various embodiments of the present disclosure, a plurality of predictions on a plurality of keywords are generated using a personalized re-ranking machine learning model based on a plurality of keyword feature vectors, one or more personalized feature vectors, and a plurality of position embeddings. In some embodiments, a plurality of predictions on a plurality of keywords comprises a respective plurality of probabilities of a user selecting the plurality of keywords. That is, the plurality of predictions may represent a determination of relevancy of the plurality of keywords to a user's interest or search query intent. In some embodiments, a plurality of rankings is assigned to a plurality of keywords based on a plurality of predictions on the plurality of keywords.

In some embodiments, the term "keyword feature vector" refers to a data construct that describes a latent representation of one or more features associated with a keyword. For example, a keyword feature vector may comprise a numerical representation (or an embedding) of features associated with a keyword. A keyword feature vector may comprise embeddings associated with one or more features of a keyword, such as text, search frequency, click/selection frequency, or custom/business rule related features (e.g., restriction or filtering). According to various embodiments of the present disclosure, a plurality of keyword feature vectors associated with a plurality of keywords from a list of suggestion keywords (e.g., a keyword feature vector for each keyword in the list of suggestion keywords) is generated and used to generate a plurality of predictions on the plurality of keywords. In some embodiments, keyword feature vectors are generated from keyword features data using a personalized re-ranking machine learning model. For example, a keyword feature vector may be generated at an input layer of a personalized re-ranking machine learning model. In some embodiments, one or more keyword feature vectors are generated and used to train a personalized re-ranking machine learning model based on training data.

In some embodiments, the term "personalized feature vector" refers to a data construct that describes a latent representation of one or more features associated with a user. For example, a personalized feature vector may comprise a numerical representation (or an embedding) of features associated with a user comprising one or more of search session data, a word prefix embedding, or user information, such as age, or gender category. In some embodiments, a personalized feature vector may comprise a numerical representation of custom/business rule related features, such as an excluded subset of keywords to specific groups of users. According to various embodiments of the present disclosure, one or more personalized feature vectors associated with a user (e.g., providing an input word prefix) is generated based on search session data associated with the user, where the one or more personalized feature vectors are used to generate a plurality of predictions on a plurality of keywords. In some embodiments, one or more personalized feature vectors are generated from personalized features data using a personalized re-ranking machine learning model. For example, one or more personalized feature vectors may be generated at an input layer of a personalized re-ranking machine learning model. In some embodiments, one or more personalized feature vectors are generated and used to train a personalized re-ranking machine learning model based on search session data associated with a user.

In some embodiments, the term "search session data" refers to a data construct that describes information about a user's activities and interactions with an information retrieval system, such as a website comprising a search engine. For example, search session data may comprise clickstream events data from search logs, website activity logs, or user search click feedback, such as keyword and user interactions (e.g., keywords selected by a certain user demographic associated with a user), and keyword and prefix interactions (e.g., keywords selected by a specific user when typing word prefixes). According to various embodiments of the present disclosure, one or more personalized feature vectors is generated based on search session data associated with a user.

In some embodiments, the term "embedding" refers to a data construct that describes a latent representation of data comprising one or more features. For example, an embedding of data may be expressed as a vector comprising one or more numbers representative of one or more features associated with content of data. In some embodiments, an embedding may be generated by mapping one or more features to one or more elements in a vector space.

In some embodiments, the term "position embedding" refers to a data construct that describes a latent representation of sequential or position order information associated with a plurality of rankings assigned to a plurality of keywords within a list of suggestion keywords. A position embedding associated with a list of suggestion keywords may be used to train a personalized re-ranking machine learning model in combination with, for example, a plurality of keyword feature vectors associated with a plurality of keywords from the list of suggestion keywords and one or more personalized feature vectors associated with a user to generate a plurality of predictions on the plurality of keywords. In some embodiments, position embedding may be used to account for position bias of a plurality of keyword in a list of suggestion keywords. For example, keywords that are presented in topmost or most prominent positions have higher likelihoods of being selected by a user regardless of relevancy. In some embodiments, one or more position embeddings are generated from keyword position data using a personalized re-ranking machine learning model. For example, one or more position embeddings may be generated at an input layer of a personalized re-ranking machine learning model.

In some embodiments, the term "training data" refers to data used to train a machine learning model to perform a desired prediction task. A machine learning model (and its weights and/or parameters) may be configured to learn (or trained on) features associated with the training data. For example, training data may comprise data including example associations between one or more features and respective one or more labels, wherein the one or more labels comprise expected classifications of the one or more features. In some embodiments, training data may be extracted from and/or generated based on search session data. In some embodiments, training data may be generated by labeling one or more word prefix-suggestion pairs. In some embodiments, training data may also comprise one or more inferred relevant keywords.

In some embodiments, the term "word prefix-suggestion pair" refers to a data construct that describes a word prefix and a typeahead suggestion keyword associated with the word prefix, e.g., based on search session data associated with a given search session, that may be used to train a machine learning model, such as a personalized re-ranking machine learning model, to generate predictions on keywords. For example, a word prefix-suggestion pair may be labeled to indicate whether a typeahead suggestion keyword comprising a keyword associated with a word prefix was clicked or selected within a same search session the word prefix was received (e.g., typed by a user into a text input field and received by an information retrieval system). In some embodiments, training data is generated by labeling one or more word prefix-suggestion pairs based on (i) occurrence of click or selection of one or more training typeahead suggestion keywords coinciding with one or more training word prefixes associated with the word prefix-suggestion pairs, or (ii) one or more inferred relevant keywords.

In some embodiments, the term "inferred relevant keyword" refers to a data construct that describes a keyword that is determined as relevant to a word prefix based on usage or selection of the keyword for a search (e.g., as a search query) within a same search session as receiving the word prefix (e.g., typed by a user into a text input field and received by an information retrieval system). For example, an inferred relevant keyword may comprise a keyword, not provided as a typeahead suggestion keyword, which was submitted as a search query to an information retrieval system subsequent to a word prefix that was typed in a same search session. In some embodiments, one or more inferred relevant keywords are extracted from search session data. In some embodiments, extracting one or more inferred relevant keywords from search session data further comprises determining the one or more inferred relevant keywords by one or more of (i) matching one or more search word prefixes with one or more beginning leading characters of one or more terms searched within a same search session associated with the search session data, (ii) matching the one or more search word prefixes with one or more leading characters of one or more middle words of the one or more terms searched, or (iii) matching the one or more search word prefixes with one or more beginning leading characters of one or more equivalent keywords with respect to the one or more terms searched.

In some embodiments, the term "equivalent keywords dictionary data object" refers to a data construct that describes a table or mapping of keywords comprising synonyms or groups of keywords that are related or semantically similar. An equivalent keywords dictionary data object may be used to identify one or more equivalent keywords. In some embodiments, one or more equivalent keywords are identified based on an equivalent keywords dictionary data object to determine one or more inferred relevant keywords by matching one or more search word prefixes with one or more beginning leading characters of the one or more equivalent keywords with respect to one or more terms searched. In some embodiments, an equivalent keywords dictionary data object is generated by (i) comparing a plurality of search results associated with a respective plurality of search queries, (ii) generating a plurality of intersection over union measurements associated with the plurality of search results based on the comparison, (iii) determining a subset of the plurality of search queries are equivalent based on the plurality of intersection over union measurements and expert label data, and (iv) determining the one or more equivalent keywords based on the one or more equivalent search queries.

In some embodiments, the term "personalized re-ranking machine learning model" refers to a data construct that describes parameters, hyperparameters, and/or defined operations of a machine learning model that is configured to (i) receive one or more lists of suggestion keywords that comprise a plurality of keywords associated with respective one or more word prefixes, (ii) generate a plurality of keyword feature vectors associated with the plurality of keywords, (iii) generate one or more personalized feature vectors based on search session data associated with a user, and (iv) generate a plurality of predictions on the plurality of keywords based on the plurality of keyword feature vectors and the one or more personalized feature vectors. In some embodiments, the personalized re-ranking machine learning model comprises a transformer machine learning model.

IV. OVERVIEW

Various embodiments of the present disclosure make important technical contributions to predictive text analysis that address the efficiency and reliability shortcomings of existing predictive text analysis solutions. For example, some techniques of the present disclosure improve the predictive accuracy of predictive machine learning models used in generating suggestion keywords for search queries. To do so, the predictive machine learning models may be trained to generate predictions on a plurality of keywords in lists of suggestion keywords based on a plurality of keyword feature vectors associated with the plurality of keywords and one or more personalized feature vectors of a specific user. By doing so, some of the techniques of the present disclosure improve training data quality and training efficiency of training predictive machine learning models while improving the predictive performance of the resulting models. It is well-understood in the relevant art that there is typically a bottleneck of predictive accuracy due to training data quality. Thus, the challenge is to prepare training data with application relevant and reliable features leading to practical predictive accuracy through innovative machine learning model architectures. Accordingly, some of the techniques of the present disclosure that improve predictive accuracy without harming training speed, such as the techniques described herein, enable improving training data quality. In doing so, some of the techniques described herein improve efficiency and quality of preparing data feeding to predictive machine learning models, thus reducing the number of computational operations needed and/or the amount of training data entries needed to train predictive machine learning models.

Various embodiments of the present disclosure improve predictive accuracy of predictive machine learning models by generating predictions for a plurality of keywords in lists of suggestion keywords based on a plurality of keyword feature vectors associated with the plurality of keywords and one or more personalized feature vectors of a specific user. As described herein, identifying user query intention and assisting users in typing more accurate search terms, such as by suggesting keywords, may facilitate and improve information retrieval quality. For example, by helping a user form more relevant search terms, improved search results may be retrieved by search engines (e.g., information retrieval systems, etc.). Search session data comprising clickstream events data from search logs may provide valuable information about how users interact with search engines (e.g., information retrieval systems, etc.) and relevance of any previous suggestion keywords. In particular, search session data may reflect user search behavior and user click information. As such, search session data may provide feedback to guide a keyword ranking process, which may improve keyword selection for future suggestion keywords.

In accordance with various embodiments of the present disclosure, a predictive machine learning model may be trained to generate predictions on keywords based on a plurality of keyword feature vectors and one or more personalized feature vectors. The plurality of keyword feature vectors may be representative of keyword features in one or more lists of suggestion keywords, whereas the one or more personalized feature vectors may be representative of search session data reflecting user search behavior and user click information. Using the new combination of feature vectors, improved predictions may be generated for one or more characters of a search query that are derived from encoded keyword information (e.g., keyword feature vectors, etc.), while being tailored to encoded user information (e.g., personalized feature vector, etc.). In this manner, some of the techniques of the present disclosure, improve embeddings for incorporating personalized relevancy by merging features of keywords and user search activities, leading to higher accuracy of performing predictive operations. This, in turn, enables improved predictive performance of machine learning models that are capable of discovering and then tailoring their predictions to individual user intents.

In accordance with various embodiments of the present disclosure, predictions may be generated for a plurality of keywords in one or more lists of suggestion keywords to rank to the keywords with respect to certain word prefixes (e.g., character inputs, etc.). By doing so, keywords may be intelligently selected, in real time, from the one or more lists of suggestion keywords and provided as typeahead suggestion keywords as a user types the one or more word prefixes. In this way, some of the techniques of the present disclosure may be practically applied, in real time, to improve text recommendations, such as typeahead suggestion keywords, relative to traditional search engines.

Examples of technologically advantageous embodiments of the present disclosure include: (i) prediction machine learning techniques that leverage unique sets of embeddings to generate improved predictions, (ii) real-time ranking and recommendation techniques for generating improved typeahead suggestions, (iii) machine learning training techniques for improving model accuracy while reducing computational resource usage, among others. Other technical improvements and advantages may be realized by one of ordinary skill in the art.

V. EXAMPLE SYSTEM OPERATIONS

As indicated, various embodiments of the present disclosure make important technical contributions to improving predictive accuracy of predictive machine learning models used in generating suggestion keywords for search queries by generating predictions on a plurality of keywords in lists of suggestion keywords based on a plurality of keyword feature vectors associated with the plurality of keywords and one or more personalized feature vectors of a specific user. By doing so, keywords may be intelligently selected, in real time, from the one or more lists of suggestion keywords and provided as typeahead suggestion keywords as a user types the one or more word prefixes. In this way, some of the techniques of the present disclosure may be practically applied, in real time, to improve text recommendations, such as typeahead suggestion keywords, relative to traditional search engines.

Figure 4:
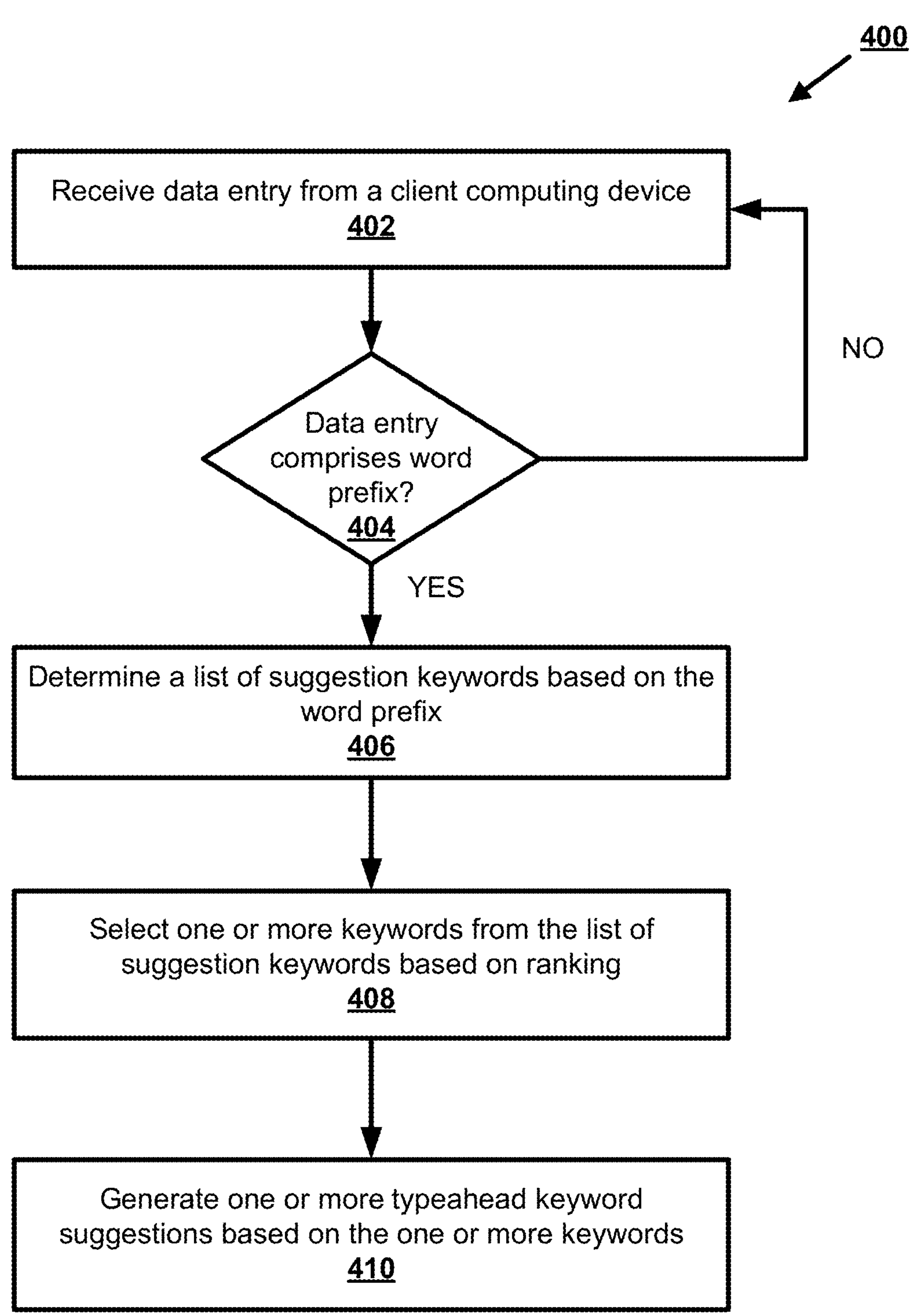
FIG. 4 is a flowchart diagram of an example process for generating suggestions for partially entered search terms in accordance with some embodiments of the present disclosure.

FIG. 4 is a flowchart diagram of an example process for generating suggestions for partially entered search terms in accordance with some embodiments of the present disclosure.

In some embodiments, via the various steps/operations of the process 400, the predictive data analysis computing entity 106 generates a plurality of predictions on a plurality of keywords from one or more lists of suggestion keywords associated with respective one or more word prefixes, assign a plurality of rankings to the plurality of keywords based on the plurality of predictions, and generate one or more typeahead suggestion keywords, responsive to an input word prefix received from a user matching one of the one or more lists of suggestion keywords, by selecting one or more of the plurality of keywords from the matching one of the one or more lists of suggestion keywords based on the plurality of rankings.

In some embodiments, the process 400 begins at step/operation 402 when the predictive data analysis computing entity 106 receives a data entry from a client computing device. A data entry may comprise one or more keywords, phrases, characters, numbers, symbols, or any combination thereof. The data entry may comprise a portion of a potential search query. In some embodiments, a search query describes a request for information. For example, a search query may comprise one or more words, terms, or a string of characters, numbers, symbols, or any combination thereof, that may be entered by a user and used by an information retrieval system to match with a corpus of content items or data objects for retrieval.

According to various embodiments of the present disclosure, the data entry may be received by predictive data analysis system 101 and/or predictive data analysis computing entity 106 from one or more client computing entities 102, either directly or indirectly via, e.g., an information retrieval system comprising a search engine. In some embodiments, the data entry may be typed into a text input field and monitored by the predictive data analysis computing entity 106.

In some embodiments, at step/operation 404, the predictive data analysis computing entity 106 determines whether the data entry comprises a word prefix. The predictive data analysis computing entity 106 may continuously monitor the data entry for a word prefix.

In some embodiments, a word prefix describes a string of characters, numbers, symbols, or any combination thereof, that may be identified as comprising one or more leading characters or a portion of one or more potential keywords. For example, a word prefix may comprise a partially entered keyword. One or more candidate keywords may be retrieved from a list of suggestion keywords based on a partially entered keyword comprising a word prefix. According to various embodiments of the present disclosure, one or more typeahead suggestion keywords are generated, responsive to an input word prefix received from a user (e.g., by an information retrieval system via a graphical user interface (GUI)), by selecting one or more of a plurality of keywords from a matching one of one or more lists of suggestion keywords associated with the input word prefix based on rankings assigned to the selected one or more keywords.

In some embodiments, if the data entry comprises a word prefix, at step/operation 406, the predictive data analysis computing entity 106 determines a list of suggestion keywords based on the word prefix.

In some embodiments, a list of suggestion keywords describes a list of candidate keywords that may be selected and used to generate one or more typeahead suggestion keywords for a given word prefix. A list of suggestion keywords may comprise a plurality of keywords that are relevant to a specific word prefix or a specific sequence of characters. For example, a plurality of keywords from a given list of suggestion keywords may comprise a specific word prefix or a specific sequence of characters in the spelling of the plurality of keywords. In some embodiments, an information retrieval system may comprise one or more lists of suggestion keywords from which one or more keywords may be retrieved from appropriate ones of the one or more lists of suggestion keywords based on word prefixes received (e.g., typed by a user into a text input field) matching the one or more lists of suggestion keywords.

In some embodiments, a list of suggestion keywords may be generated based on (i) a current version of an autocomplete list, (ii) a list of keywords generated based on overall frequency (e.g., most-frequently searched keywords), (iii) age or gender category, (iv) user clickstream (e.g., most-frequently clicked or selected), or (iv) a combination thereof. That is, a list of suggestion keywords may comprise a relatively expansive set of candidate keywords from which a subset of the candidate keywords may be selected to generate one or more typeahead suggestion keywords based on an assignment of rankings to the candidate keywords.

In some embodiments, a keyword describes a description of a concept comprising a term, word, or string of characters, numbers, symbols, or any combination thereof, that may be used in a search query to reference or indicate content for retrieval by an information retrieval system.

In some embodiments, at step/operation 408, the predictive data analysis computing entity 106 selects one or more keywords from the list of suggestion keywords based on ranking. In some embodiments, a ranking describes a rank, position, or order assigned to a member of a set of data elements, such as a keyword in a list of suggestion keywords, based on an evaluation or grading of the member relative to one or more other members within the set. In some embodiments, a ranking may be representative of relevancy or likelihood of a given user selecting a given keyword (relative to other keywords within a list of suggestion keywords) assigned the ranking. In some embodiments, selecting the one or more keywords comprises determining one or more keywords comprising at least a minimum ranking from a list of suggestion keyword. In some embodiments, determining the one or more keywords may comprise selecting top ranking ones of a plurality of keywords (e.g., comprising the highest rankings) from the list of suggestion keywords. For example, a plurality of keywords from the list of suggestion keywords may be more than a target number of keywords to display to a user, and as such, a subset of the plurality of keywords may be selected.

According to various embodiments of the present disclosure, a plurality of rankings are assigned to a plurality of keywords based on a plurality of predictions on the plurality of keywords. For example, a ranking may be assigned to a keyword in a list of suggestion keywords based on a prediction on the keyword by using a personalized re-ranking machine learning model. In some embodiments, a list of suggestion keywords comprises a plurality of keywords that are associated with a respective plurality of initial rankings, where the plurality of keywords are re-ranked by modifying the plurality of initial rankings based on a prediction on each of the plurality of keywords generated by using a personalized re-ranking machine learning model. Assigning rankings to keywords is described in further detail with respect to the description of FIG. 5.

In some embodiments, rankings are assigned to keywords in one or more lists of suggestion keywords based on predictions on the keywords such that the keywords may be selected from the one or more lists of suggestion keywords to generate one or more typeahead suggestion keywords in response to receiving word prefixes associated with the one or more lists of suggestion keywords.

In some embodiments, at step/operation 410, the predictive data analysis computing entity 106 generates one or more typeahead suggestion keywords based on the one or more keywords. In some embodiments, a typeahead suggestion keyword describes a keyword that may be provided as a suggestion for completion of a word prefix entered by a user on a GUI of an information retrieval system. For example, one or more typeahead suggestion keywords may be generated based on rankings assigned to keywords associated with a word prefix that a user has provided thus far via a GUI of an information retrieval system. One or more typeahead suggestion keywords may be rendered or presented to a user on a GUI of an information retrieval system while the user is typing (e.g., after a word prefix or a certain amount of characters, numbers, symbols, or any combination thereof, has been typed into a text input field). In some embodiments, typeahead suggestion keywords that have been generated and/or presented may be dynamically changed or be updated as the user is typing a keyword (e.g., to match typeahead suggestion keywords to user input). Typeahead suggestion keywords may be reviewed and accepted to complete or replace input received from a user by an information retrieval system, e.g., via a GUI.

Figure 5:
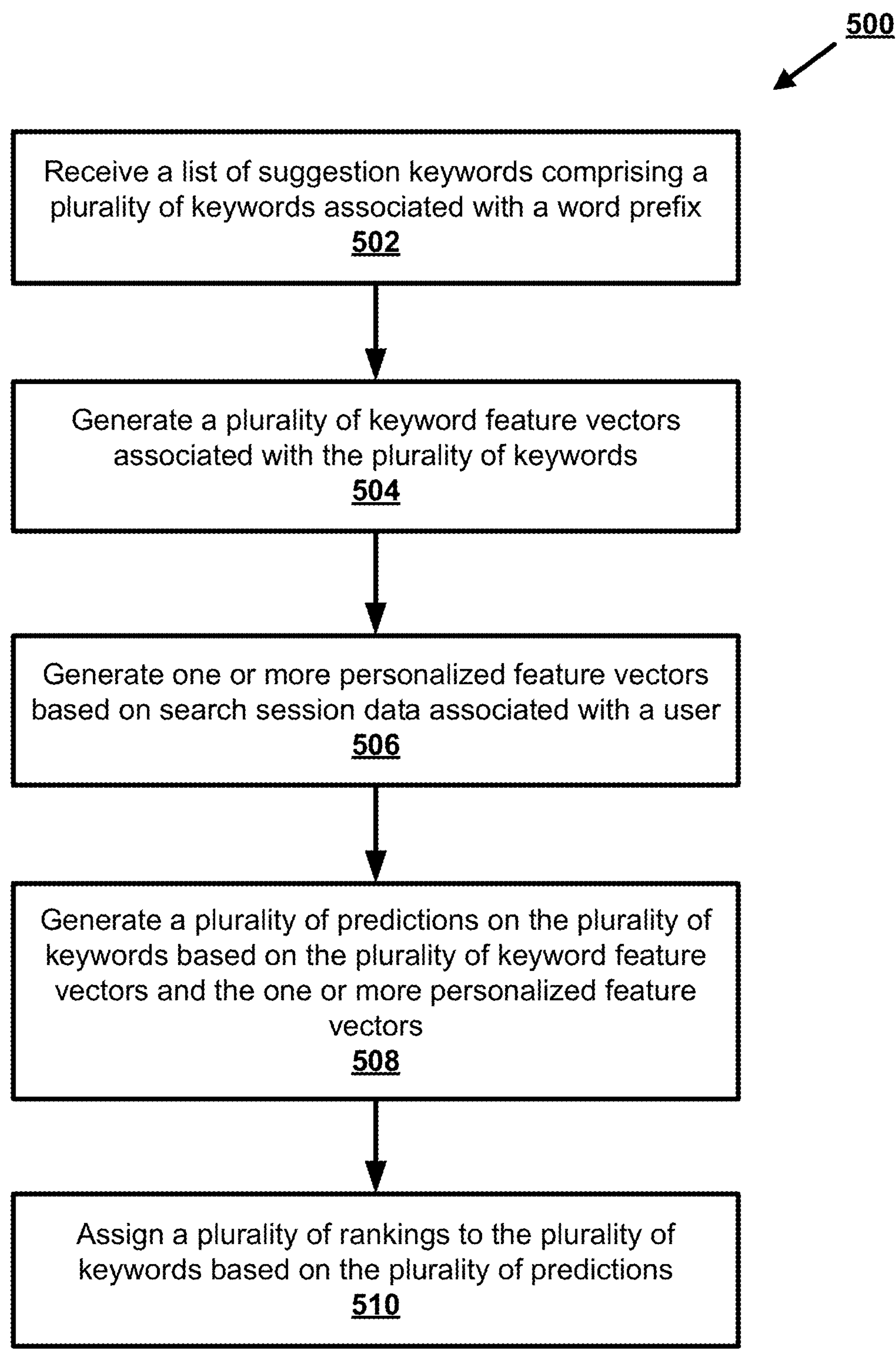
FIG. 5 is a flowchart diagram of an example process for assigning rankings to keywords in accordance with some embodiments of the present disclosure.

FIG. 5 is a flowchart diagram of an example process for assigning rankings to keywords in accordance with some embodiments of the present disclosure.

In some embodiments, via the various steps/operations of the process 500, the predictive data analysis computing entity 106 uses a personalized re-ranking machine learning model to generate a plurality of predictions on a plurality of keywords from respective one or more lists of suggestion keywords.

In some embodiments, a personalized re-ranking machine learning model describes parameters, hyperparameters, and/or defined operations of a machine learning model that is configured to (i) receive one or more lists of suggestion keywords that comprise a plurality of keywords associated with respective one or more word prefixes, (ii) generate a plurality of keyword feature vectors associated with the plurality of keywords, (iii) generate one or more personalized feature vectors based on search session data associated with a user, and (iv) generate a plurality of predictions on the plurality of keywords based on the plurality of keyword feature vectors and the one or more personalized feature vectors. In some embodiments, the personalized re-ranking machine learning model comprises a transformer machine learning model.

In some embodiments, the process 500 begins at step/operation 502 when the predictive data analysis computing entity 106 receives, using a personalized re-ranking machine learning model, a list of suggestion keywords comprising a plurality of keywords associated with a word prefix.

In some embodiments, at step/operation 504, the predictive data analysis computing entity 106 generates, using the personalized re-ranking machine learning model, a plurality of keyword feature vectors associated with the plurality of keywords.

In some embodiments, a keyword feature vector describes a latent representation of one or more features associated with a keyword. For example, a keyword feature vector may comprise a numerical representation (or an embedding) of features associated with a keyword. A keyword feature vector may comprise embeddings associated with one or more features of a keyword, such as text, search frequency, click/selection frequency, or custom/business rule related features (e.g., restriction or filtering). According to various embodiments of the present disclosure, a plurality of keyword feature vectors associated with a plurality of keywords from a list of suggestion keywords (e.g., a keyword feature vector for each keyword in the list of suggestion keywords) is generated and used to generate a plurality of predictions on the plurality of keywords. In some embodiments, keyword feature vectors are generated from keyword features data using a personalized re-ranking machine learning model. For example, a keyword feature vector may be generated at an input layer of a personalized re-ranking machine learning model.

In some embodiments, an embedding describes a latent representation of data comprising one or more features. For example, an embedding of data may be expressed as a vector comprising one or more numbers representative of one or more features associated with content of data. In some embodiments, an embedding may be generated by mapping one or more features to one or more elements in a vector space.

In some embodiments, at step/operation 506, the predictive data analysis computing entity 106 generates, using the personalized re-ranking machine learning model, one or more personalized feature vectors based on search session data associated with a user.

In some embodiments, a personalized feature vector describes a latent representation of one or more features associated with a user. For example, a personalized feature vector may comprise a numerical representation (or an embedding) of features associated with a user comprising one or more of search session data, a word prefix embedding, or user information, such as age, or gender category. In some embodiments, a personalized feature vector may comprise a numerical representation of custom/business rule related features, such as an excluded subset of keywords to specific groups of users. According to various embodiments of the present disclosure, one or more personalized feature vectors associated with a user (e.g., providing an input word prefix) is generated based on search session data associated with the user, wherein the one or more personalized feature vectors are used to generate a plurality of predictions on a plurality of keywords. In some embodiments, one or more personalized feature vectors are generated at an input layer of a personalized re-ranking machine learning model.

In some embodiments, a search session data describes information about a user's activities and interactions with an information retrieval system, such as a website comprising a search engine. For example, search session data may comprise clickstream events data from search logs, website activity logs, or user search click feedback, such as keyword and user interactions (e.g., keywords selected by a certain user demographic associated with a user), and keyword and prefix interactions (e.g., keywords selected by a specific user when typing word prefixes). According to various embodiments of the present disclosure, one or more personalized feature vectors is generated based on search session data associated with a user.

In some embodiments, at step/operation 508, the predictive data analysis computing entity 106 generates, using the personalized re-ranking machine learning model, a plurality of predictions on the plurality of keywords based on the plurality of keyword feature vectors and the one or more personalized feature vectors. In some embodiments, a prediction describes an output generated by an output layer of a machine learning model. In some embodiments, a plurality of predictions on a plurality of keywords comprises a respective plurality of probabilities of a user selecting the plurality of keywords. That is, the plurality of predictions may represent a determination of relevancy of the plurality of keywords to a user's interest or search query intent.

In some embodiments, the plurality of predictions is further generated based on a plurality of position embeddings associated with the list of suggestion keywords. In some embodiments, a position embedding describes a latent representation of sequential or position order information associated with a plurality of rankings assigned to a plurality of keywords within a list of suggestion keywords. A position embedding associated with a list of suggestion keywords may be used to train a personalized re-ranking machine learning model in combination with, for example, a plurality of keyword feature vectors associated with a plurality of keywords from the list of suggestion keywords and one or more personalized feature vectors associated with a user to generate a plurality of predictions on the plurality of keywords. In some embodiments, position embedding may be used to account for position bias of a plurality of keyword in a list of suggestion keywords. For example, keywords that are presented in topmost or most prominent positions have higher likelihoods of being selected by a user regardless of relevancy. In some embodiments, one or more position embeddings are generated from keyword position data using a personalized re-ranking machine learning model. For example, one or more position embeddings may be generated at an input layer of a personalized re-ranking machine learning model.

In some embodiments, at step/operation 510, the predictive data analysis computing entity 106 assigns a plurality of rankings to the plurality of keywords based on the plurality of predictions. For example, keywords associated with predictions comprising higher probabilities may be assigned higher rankings.

According to various embodiments of the present disclosure, training data is used to train the personalized re-ranking machine learning model. In some embodiments, training data describes data used to train a machine learning model to perform a desired prediction task. A machine learning model (and its weights and/or parameters) may be configured to learn (or trained on) features associated with the training data. For example, training data may comprise data including example associations between one or more features and respective one or more labels, wherein the one or more labels comprise expected classifications of the one or more features. In some embodiments, training data may be extracted from and/or generated based on search session data. In some embodiments, training data comprising (i) historical typeahead suggestion keywords provided to a user in response to a user entering one or more prefixes during one or more search sessions and (ii) indications of whether the typeahead suggestion keywords were selected, may be used to train a machine learning model to generate probabilities of a user selecting certain keywords when certain prefixes are entered by the user. In some embodiments, training data may be generated by labeling one or more word prefix-suggestion pairs. In some embodiments, training data may also comprise one or more inferred relevant keywords.

In some embodiments, a word prefix-suggestion pair describes a word prefix and a typeahead suggestion keyword associated with the word prefix, e.g., based on search session data associated with a given search session, which may be used to train the personalized re-ranking machine learning model to generate predictions on keywords. For example, a word prefix-suggestion pair may be labeled to indicate whether a typeahead suggestion keyword comprising a keyword associated with a word prefix was clicked or selected within a same search session the word prefix was received (e.g., typed by a user into a text input field and received by an information retrieval system). In some embodiments, training data is generated by labeling one or more word prefix-suggestion pairs based on (i) occurrence of click or selection of one or more training typeahead suggestion keywords coinciding with one or more training word prefixes associated with the word prefix-suggestion pairs, or (ii) one or more inferred relevant keywords.

In some embodiments, an inferred relevant keyword describes a keyword that is determined as relevant to a word prefix based on usage or selection of the keyword for a search (e.g., as a search query) within a same search session as receiving the word prefix (e.g., typed by a user into a text input field and received by an information retrieval system). For example, an inferred relevant keyword may comprise a keyword, not provided as a typeahead suggestion keyword, which was submitted as a search query to an information retrieval system subsequent to a word prefix that was typed in a same search session. In some embodiments, one or more inferred relevant keywords are extracted from search session data.

Figure 6:
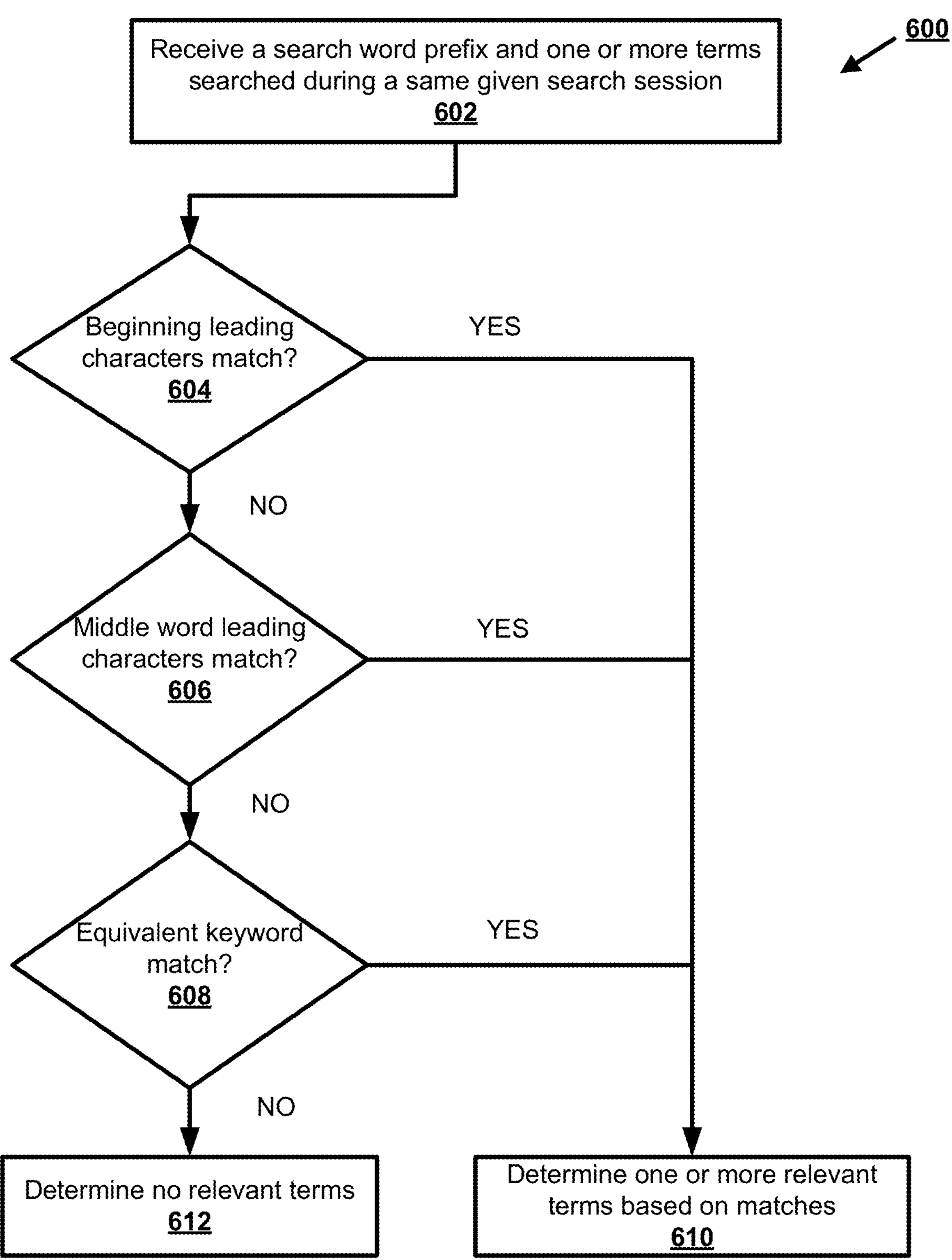
FIG. 6 is a flowchart diagram of an example process for extracting inferred relevant keywords from search session data in accordance with some embodiments of the present disclosure.

FIG. 6 is a flowchart diagram of an example process for extracting inferred relevant keywords from search session data in accordance with some embodiments of the present disclosure. In an example embodiment, a user may type a few different queries for a single search intention within a session as well as search with several intentions within the same session, thus making it challenging to identify relevant search terms for a word prefix that a user typed. In some embodiments, via the various steps/operations of the process 600, the predictive data analysis computing entity 106 determines terms searched matching user entered word prefixes to retrieve relevant search terms.

In some embodiments, the process 600 begins at step/operation 602 when the predictive data analysis computing entity 106 receives a search word prefix and one or more terms searched within a same given search session. The search word prefix may be compared with the one or more terms searched.

In some embodiments, at step/operation 604, the predictive data analysis computing entity 106 determines whether the search word prefix matches with one or more beginning leading characters of one or more terms searched within a same search session associated with the search session data. One or more beginning leading characters of the one or more terms searched may comprise one or more first characters (e.g., letters, numbers, or symbols) in the spelling of a first word associated with the one or more terms searched. For example, beginning leading characters of "pathology" may comprise "path."

In some embodiments, if the search word prefix matches with the one or more beginning leading characters of the one or more terms searched, at step/operation 610, the predictive data analysis computing entity 106 determines one or more relevant terms based on the matches.

Otherwise, if there are no matches, in some embodiments, at step/operation 606, the predictive data analysis computing entity 106 determines whether the search word prefix matches with one or more leading characters of one or more middle words of the one or more terms searched. One or more leading characters of the one or more middle words of the one or more terms searched may comprise one or more first characters (e.g., letters, numbers, or symbols) in the spelling of a middle word associated with the one or more terms searched. The middle word may comprise any nonfirst word of the one or more terms searched. For example, leading characters of a middle word of "clinical pathology" may comprise "path."

In some embodiments, if the search word prefix matches with the one or more leading characters of the one or more middle words of the one or more terms searched, at step/operation 610, the predictive data analysis computing entity 106 determines one or more relevant terms based on the matches.

Otherwise, if there are no matches, in some embodiments, at step/operation 608, the predictive data analysis computing entity 106 determines whether the search word prefix matches with one or more beginning leading characters of one or more equivalent keywords with respect to the one or more terms searched.

In some embodiments, an equivalent keywords dictionary data object describes a table or mapping of keywords comprising synonyms or groups of keywords that are related or semantically similar. An equivalent keywords dictionary data object may be used to identify one or more equivalent keywords. In some embodiments, one or more equivalent keywords are identified based on an equivalent keywords dictionary data object to determine one or more inferred relevant keywords by matching one or more search word prefixes with one or more beginning leading characters of the one or more equivalent keywords with respect to one or more terms searched. Generating an equivalent keywords dictionary data object is described in further detail with respect to the description of FIG. 7.

Figure 7:
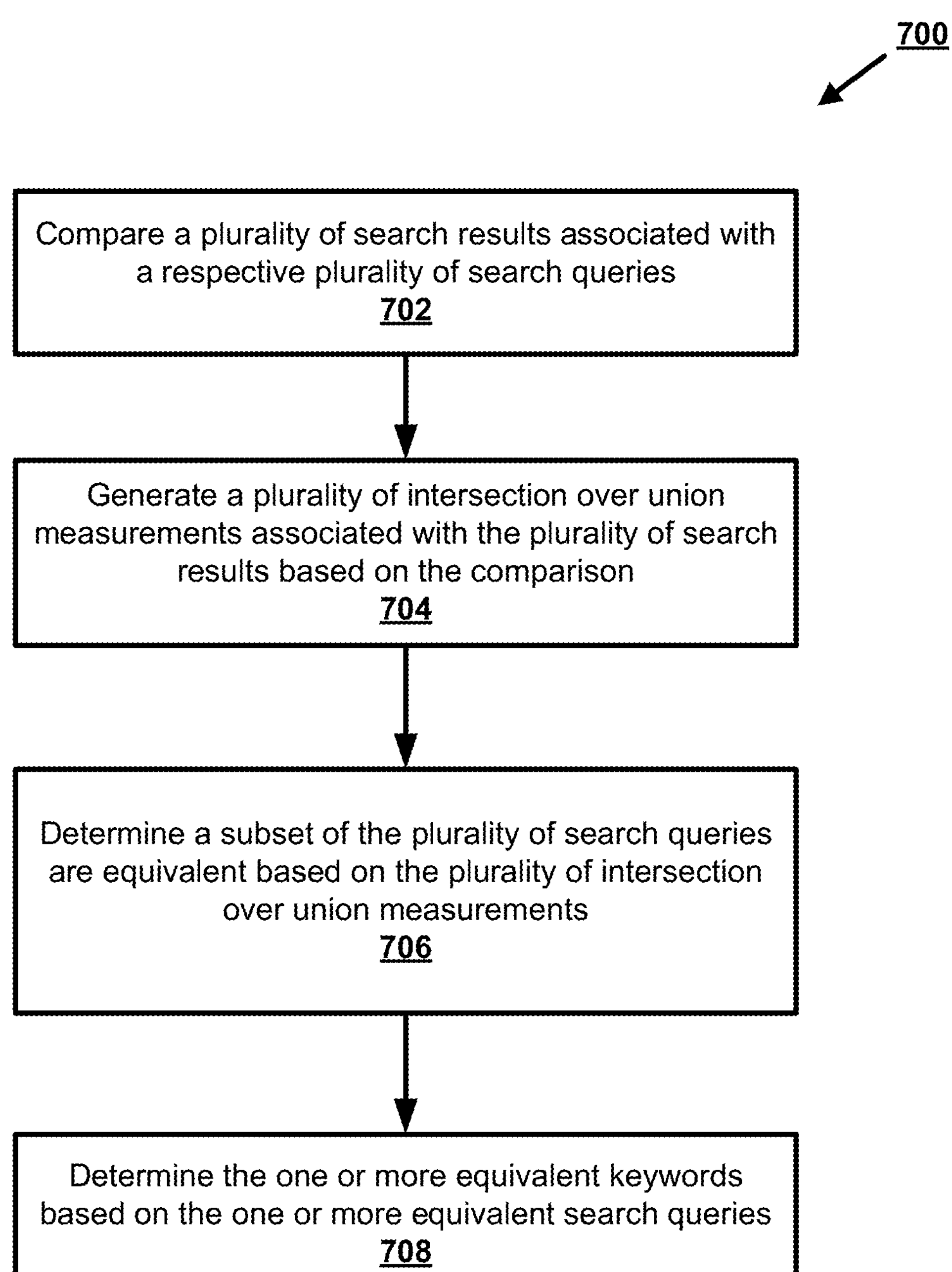
FIG. 7 is a flowchart diagram of an example process for generating an equivalent keywords dictionary data object in accordance with some embodiments of the present disclosure.

FIG. 7 is a flowchart diagram of an example process for generating an equivalent keywords dictionary data object in accordance with some embodiments of the present disclosure. Via the various steps/operations of the process 700, the predictive data analysis computing entity 106 generates an equivalent keywords dictionary data object for providing an equivalent keyword lookup for determining relevant keywords.

In some embodiments, the process 700 begins at step/operation 702 when the predictive data analysis computing entity 106 compares a plurality of search results associated with a respective plurality of search queries. In some embodiments, search session data, such as a historical search log, is used to retrieve the plurality of search queries and their corresponding search results. The plurality of search results may comprise respective sets of content items associated with the plurality of search queries, e.g., retrieved by an information retrieval system.

In some embodiments, at step/operation 704, the predictive data analysis computing entity 106 generates a plurality of intersection over union measurements associated with the plurality of search results based on the comparison. In some embodiments, an intersection over union metric may comprise an extent of overlap of search results between search queries. As such, equivalence of search queries may be determined based on the extent of overlap of their search results.

In some embodiments, at step/operation 706, the predictive data analysis computing entity 106 determines a subset of the plurality of search queries are equivalent based on the plurality of intersection over union measurements. In one example embodiment, if search results associated with two or more of the plurality of search queries comprise intersection over union measurements greater than a defined threshold, the two or more search queries may be determined as equivalent. For example, the defined threshold may be determined by selecting (e.g., randomly) search query-result pairs (e.g., two search queries and associated search results) with intersection over union measurement greater than 0.5. Pairs of equivalent search queries may be clustered thereby forming a cluster of equivalent search queries.

In some embodiments, determining the subset of the plurality of search queries are equivalent is further based on expert label data. Expert label data may comprise an indication that at least a portion of the subset of the plurality of search queries are equivalent.

In some embodiments, at step/operation 708, the predictive data analysis computing entity 106 determines the one or more equivalent keywords based on the one or more equivalent search queries.

Returning to FIG. 6, in some embodiments, if the search word prefix matches with one or more beginning leading characters of one or more equivalent keywords, at step/operation 610, the predictive data analysis computing entity 106 determines one or more relevant terms based on the matches. Otherwise, if there are no matches, in some embodiments, at step/operation 612, the predictive data analysis computing entity 106 determines that there are no relevant terms.

Figure 8:
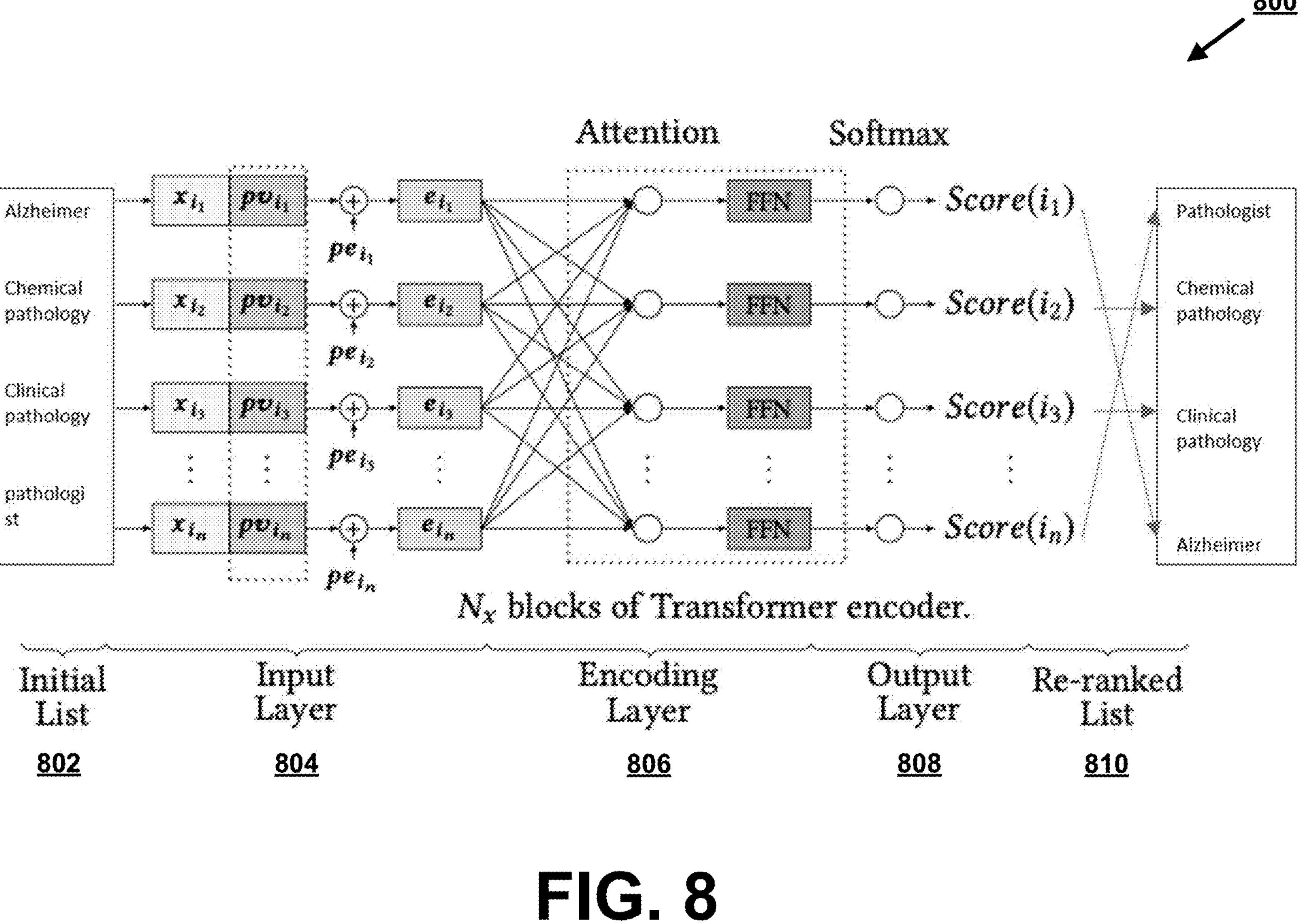
FIG. 8 depicts an operational example of a personalized re-ranking machine learning model architecture in accordance with some embodiments of the present disclosure.

FIG. 8 depicts an operational example of a personalized re-ranking machine learning model architecture 800 in accordance with some embodiments of the present disclosure.

As depicted in FIG. 8, personalized re-ranking machine learning model architecture 800 comprises an initial list 802, an input layer 804, an encoding layer 806, an output layer 808, and a re-ranked list 810.

The initial list 802 may comprise a list of suggested keywords comprising a plurality of keywords associated with a respective plurality of initial rankings.

The input layer 804 may be configured to generate (i) keyword feature vectors associated with the initial list 802 and (ii) personalized feature vectors associated with a user.

The encoding layer 806 may comprise $N_x$ blocks of transformer encoders comprising one or more attention mechanisms and feedforward networks configured to generate one or more predictions on the initial list 802 (e.g., a plurality of keywords) based on the keyword feature vectors and the personalized feature vectors from the input layer 804.

The output layer 808 may be configured to generate one or more probability scores based on the predictions generated using the encoding layer 806. The output layer 808 may comprise an activation function, such as Softmax to normalize prediction output for generating the one or more probability scores.

Re-ranked list 810 may comprise a modification of initial list 802 based on the one or more probability scores. For example, one or more keywords in the initial list 802 may be assigned new rankings based on the one or more probability scores and re-ordered based on the new rankings to generate the re-ranked list 810.

Accordingly, as described above, various embodiments of the present disclosure make important technical contributions to improving predictive accuracy of predictive machine learning models used in generating suggestion keywords for search queries by generating predictions on a plurality of keywords in lists of suggestion keywords based on a plurality of keyword feature vectors associated with the plurality of keywords and one or more personalized feature vectors of a specific user. This approach improves training data quality and training efficiency of training predictive machine learning models. It is well-understood in the relevant art that there is typically a bottleneck of predictive accuracy due to training data quality. Thus, the challenge is to prepare training data with application relevant and reliable features leading to practical predictive accuracy through innovative machine learning model architectures. Accordingly, techniques that improve predictive accuracy without harming training speed, such as the techniques described herein, enable improving training data quality. In doing so, the techniques described herein improve efficiency and quality of preparing data feeding to predictive machine learning models, thus reducing the number of computational operations needed and/or the amount of training data entries needed to train predictive machine learning models.

Some techniques of the present disclosure enable the generation of prediction outputs that may be used to assign rankings of a plurality of keywords that may be used for providing typeahead suggestion keywords. The techniques of the present disclosure may be used, applied, and/or otherwise leveraged to generate typeahead suggestion keywords, which may help in the generation of more relevant search queries matching an intent of a user. A personalized re-ranking machine learning model of the present disclosure may be leveraged to rank a list of keyword suggestions that improve the performance of a computing system (e.g., a computer itself, etc.) with respect to various predictive actions performed by the predictive data analysis computing entity 106, such as for the matching of suggestion keywords to search session activities of a user.

In some examples, the typeahead suggestion keywords may include predictive actions that may be based on a prediction domain. A prediction domain may include any environment in which computing systems may be applied to achieve real-word insights, such as predictions (e.g., predictive intents), and initiate the performance of computing tasks, such as predictive actions to act on the real-world insights. These predictive actions may cause real-world changes, for example, by controlling a hardware component, providing alerts, interactive actions, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method comprising: receiving, by one or more processors, a list of suggestion keywords that comprises a plurality of keywords associated with a word prefix; generating, by the one or more processors, a plurality of keyword feature vectors associated with the plurality of keywords; generating, by the one or more processors, one or more personalized feature vectors based on search session data associated with a user; generating, by the one or more processors, a plurality of predictions on the plurality of keywords based on the plurality of keyword feature vectors and the one or more personalized feature vectors; assigning, by the one or more processors, a plurality of rankings to the plurality of keywords based on the plurality of predictions; and generating, by the one or more processors, one or more typeahead suggestion keywords, responsive to the word prefix received from the user, based on the plurality of rankings.

Example 2. The computer-implemented method of any of the preceding examples further comprising generating the plurality of predictions using a personalized re-ranking machine learning model comprising a transformer machine learning model.

Example 3. The computer-implemented method of any of the preceding examples, wherein the plurality of predictions comprise a respective plurality of probabilities of the user selecting the plurality of keywords.

Example 4. The computer-implemented method of any of the preceding examples further comprising generating the plurality of predictions based on a plurality of position embeddings associated with the list of suggestion keywords.

Example 5. The computer-implemented method of any of the preceding examples further comprising: generating training data based on the search session data; and training the personalized re-ranking machine learning model based on the training data.

Example 6. The computer-implemented method of any of the preceding examples, wherein generating the training data further comprises labeling one or more word prefix-suggestion pairs based on (i) occurrence of click or selection of one or more training typeahead suggestion keywords coinciding with one or more training word prefixes associated with the word prefix-suggestion pairs, or (ii) one or more inferred relevant keywords.

Example 7. The computer-implemented method of any of the preceding examples further comprising extracting the one or more inferred relevant keywords from the search session data.

Example 8. The computer-implemented method of any of the preceding examples, wherein extracting the one or more inferred relevant keywords from the search session data further comprises determining the one or more inferred relevant keywords by one or more of (i) matching one or more search word prefixes with one or more beginning leading characters of one or more terms searched during a same search session associated with the search session data, (ii) matching the one or more search word prefixes with one or more leading characters of one or more middle words of the one or more terms searched, or (iii) matching the one or more search word prefixes with one or more beginning leading characters of one or more equivalent keywords with respect to the one or more terms searched.

Example 9. The computer-implemented method of any of the preceding examples further comprising identifying the one or more equivalent keywords based on an equivalent keywords dictionary data object.

Example 10. The computer-implemented method of any of the preceding examples further comprising generating the equivalent keywords dictionary data object by: comparing a plurality of search results associated with a respective plurality of search queries; generating a plurality of intersection over union measurements associated with the plurality of search results based on the comparison; determining a subset of the plurality of search queries are equivalent based on the plurality of intersection over union measurements and expert label data; and determining the one or more equivalent keywords based on the one or more equivalent search queries.

Example 11. The computer-implemented method of any of the preceding examples, wherein the plurality of keywords are associated with a respective plurality of initial rankings, and assigning the plurality of rankings further comprises re-ranking the plurality of keywords by modifying the plurality of initial rankings based on the plurality of predictions.

Example 12. A computing system comprising memory and one or more processors communicatively coupled to the memory, the one or more processors configured to: receive a list of suggestion keywords that comprises a plurality of keywords associated with a word prefix; generate a plurality of keyword feature vectors associated with the plurality of keywords; generate one or more personalized feature vectors based on search session data associated with a user; generate a plurality of predictions on the plurality of keywords based on the plurality of keyword feature vectors and the one or more personalized feature vectors; assign a plurality of rankings to the plurality of keywords based on the plurality of predictions; and generate one or more typeahead suggestion keywords, responsive to the word prefix received from the user, based on the plurality of rankings.

Example 13. The computing system of any of the preceding examples, wherein the one or more processors are further configured to generate the plurality of predictions using a personalized re-ranking machine learning model comprising a transformer machine learning model.

Example 14. The computing system of any of the preceding examples, wherein the plurality of predictions comprise a respective plurality of probabilities of the user selecting the plurality of keywords.

Example 15. The computing system of any of the preceding examples, wherein the one or more processors are further configured to generate the plurality of predictions based on a plurality of position embeddings associated with the list of suggestion keywords.

Example 16. The computing system of any of the preceding examples, wherein the one or more processors are further configured to: generate training data based on the search session data; and train the personalized re-ranking machine learning model based on the training data.

Example 17. The computing system of any of the preceding examples, wherein the one or more processors are further configured to label one or more word prefix-suggestion pairs based on (i) occurrence of click or selection of one or more training typeahead suggestion keywords coinciding with one or more training word prefixes associated with the word prefix-suggestion pairs, or (ii) one or more inferred relevant keywords.

Example 18. The computing system of any of the preceding examples, wherein the one or more processors are further configured to extract the one or more inferred relevant keywords from the search session data.

Example 19. The computing system of any of the preceding examples, wherein the one or more processors are further configured to determine the one or more inferred relevant keywords by one or more of (i) matching one or more search word prefixes with one or more beginning leading characters of one or more terms searched during a same search session associated with the search session data, (ii) matching the one or more search word prefixes with one or more leading characters of one or more middle words of the one or more terms searched, or (iii) matching the one or more search word prefixes with one or more beginning leading characters of one or more equivalent keywords with respect to the one or more terms searched.

Example 20. The computing system of any of the preceding examples, wherein the one or more processors are further configured to identify the one or more equivalent keywords based on an equivalent keywords dictionary data object.

Example 21. The computing system of any of the preceding examples, wherein the one or more processors are further configured to generate the equivalent keywords dictionary data object by: comparing a plurality of search results associated with a respective plurality of search queries; generating a plurality of intersection over union measurements associated with the plurality of search results based on the comparison; determining a subset of the plurality of search queries are equivalent based on the plurality of intersection over union measurements and expert label data; and determining the one or more equivalent keywords based on the one or more equivalent search queries.

Example 22. The computing system of any of the preceding examples, wherein the plurality of keywords are associated with a respective plurality of initial rankings, and wherein the one or more processors are further configured to re-rank the plurality of keywords by modifying the plurality of initial rankings based on the plurality of predictions.

Example 23. One or more non-transitory computer-readable storage media including instructions that, when executed by one or more processors, cause the one or more processors to: receive a list of suggestion keywords that comprises a plurality of keywords associated with a word prefix; generate a plurality of keyword feature vectors associated with the plurality of keywords; generate one or more personalized feature vectors based on search session data associated with a user; generate a plurality of predictions on the plurality of keywords based on the plurality of keyword feature vectors and the one or more personalized feature vectors; assign a plurality of rankings to the plurality of keywords based on the plurality of predictions; and generate one or more typeahead suggestion keywords, responsive to the word prefix received from the user, based on the plurality of rankings.

Example 24. The one or more non-transitory computer-readable storage media further including instructions that, when executed by the one or more processors, cause the one or more processors to generate the plurality of predictions using a personalized re-ranking machine learning model comprising a transformer machine learning model.

Example 25. The one or more non-transitory computer-readable storage media, wherein the plurality of predictions comprise a respective plurality of probabilities of the user selecting the plurality of keywords.

Example 26. The one or more non-transitory computer-readable storage media further including instructions that, when executed by the one or more processors, cause the one or more processors to generate the plurality of predictions based on a plurality of position embeddings associated with the list of suggestion keywords.

Example 27. The one or more non-transitory computer-readable storage media further including instructions that, when executed by the one or more processors, cause the one or more processors to: generate training data based on the search session data; and train the personalized re-ranking machine learning model based on the training data.

Example 28. The one or more non-transitory computer-readable storage media further including instructions that, when executed by the one or more processors, cause the one or more processors to label one or more word prefix-suggestion pairs based on (i) occurrence of click or selection of one or more training typeahead suggestion keywords coinciding with one or more training word prefixes associated with the word prefix-suggestion pairs, or (ii) one or more inferred relevant keywords.

Example 29. The one or more non-transitory computer-readable storage media further including instructions that, when executed by the one or more processors, cause the one or more processors to extract the one or more inferred relevant keywords from the search session data.

Example 30. The one or more non-transitory computer-readable storage media further including instructions that, when executed by the one or more processors, cause the one or more processors to determine the one or more inferred relevant keywords by one or more of (i) matching one or more search word prefixes with one or more beginning leading characters of one or more terms searched during a same search session associated with the search session data, (ii) matching the one or more search word prefixes with one or more leading characters of one or more middle words of the one or more terms searched, or (iii) matching the one or more search word prefixes with one or more beginning leading characters of one or more equivalent keywords with respect to the one or more terms searched.

Example 31. The one or more non-transitory computer-readable storage media further including instructions that, when executed by the one or more processors, cause the one or more processors to identify the one or more equivalent keywords based on an equivalent keywords dictionary data object.

Example 32. The one or more non-transitory computer-readable storage media further including instructions that, when executed by the one or more processors, cause the one or more processors to generate the equivalent keywords dictionary data object by: comparing a plurality of search results associated with a respective plurality of search queries; generating a plurality of intersection over union measurements associated with the plurality of search results based on the comparison; determining a subset of the plurality of search queries are equivalent based on the plurality of intersection over union measurements and expert label data; and determining the one or more equivalent keywords based on the one or more equivalent search queries.

Example 33. The one or more non-transitory computer-readable storage media, wherein the plurality of keywords are associated with a respective plurality of initial rankings, and wherein the one or more processors are further configured to re-rank the plurality of keywords by modifying the plurality of initial rankings based on the plurality of predictions.

The invention claimed is:

1. A computer-implemented method comprising:

receiving, by one or more processors and via a graphical user interface, a word prefix from a computing device of a user;

providing, by the one or more processors and to a personalized re-ranking machine learning model, a plurality of keywords to produce a plurality of predictions on the plurality of keywords, wherein:

(i) the plurality of keywords comprises one or more suggestion keywords that are associated with the word prefix, (ii) the plurality of predictions on the plurality of keywords is generated by the personalized re-ranking machine learning model based on a plurality of keyword feature vectors and one or more personalized feature vectors, (iii) the plurality of keyword feature vectors corresponds to the plurality of keywords, (iv) the one or more personalized feature vectors correspond to search session data that is associated with the user, (v) the personalized re-ranking machine learning model is stored in association with one or more inferred relevant keywords, (vi) the one or more inferred relevant keywords are determined by one or more of:

(a) matching one or more search word prefixes with one or more beginning leading characters of one or more terms searched during a same search session associated with the search session data, (b) matching the one or more search word prefixes with one or more leading characters of one or more middle words of the one or more terms searched, or (c) matching the one or more search word prefixes with one or more beginning leading characters of one or more equivalent keywords with respect to the one or more terms searched, and (vii) a plurality of rankings is assigned to the plurality of keywords based on the plurality of predictions; and providing, by the one or more processors and via the graphical user interface, the one or more suggestion keywords for the word prefix, responsive to the word prefix received from the computing device, based on the plurality of rankings.

2. The computer-implemented method of claim 1 further comprising generating the plurality of predictions on the plurality of keywords from a list of suggestion keywords, including the one or more suggestion keywords, by using the personalized re-ranking machine learning model.

3. The computer-implemented method of claim 1, wherein the plurality of predictions comprises a respective plurality of probabilities of the user selecting the plurality of keywords.

4. The computer-implemented method of claim 1 further comprising generating the plurality of predictions based on a plurality of position embeddings associated with the one or more suggestion keywords.

5. The computer-implemented method of claim 1 further comprising:

generating training data based on the search session data; and training the personalized re-ranking machine learning model based on the training data.

6. The computer-implemented method of claim 5, wherein generating the training data further comprises labeling one or more word prefix-suggestion pairs based on (i) occurrence of a click or a selection of one or more training typeahead suggestion keywords coinciding with one or more training word prefixes associated with the one or more word prefix-suggestion pairs, or (ii) the one or more inferred relevant keywords.

7. The computer-implemented method of claim 1 further comprising identifying the one or more equivalent keywords based on an equivalent keywords dictionary data object.

8. The computer-implemented method of claim 7 further comprising generating the equivalent keywords dictionary data object by:

generating a plurality of intersection over union measurements associated with a plurality of search results based on a comparison between the plurality of search results associated with a plurality of search queries;

determining a subset of the plurality of search queries are one or more equivalent search queries based on the plurality of intersection over union measurements and expert label data; and determining the one or more equivalent keywords based on the one or more equivalent search queries.

9. The computer-implemented method of claim 1, wherein:

(i) the plurality of keywords is associated with a plurality of initial rankings, and (ii) the plurality of rankings is assigned by modifying the plurality of initial rankings based on the plurality of predictions to re-rank the plurality of keywords.

10. The computer-implemented method of claim 1 further comprising generating the one or more personalized feature vectors based on the search session data, wherein:

(i) the one or more personalized feature vectors comprise one or more embeddings of one or more features that are associated with the user, and (ii) the one or more features comprise search session data, one or more word prefix embeddings, an age of the user, or a gender category corresponding to the user.

11. A system comprising one or more processors and one or more memories storing processor-executable instructions that, when executed by the one or more processors, cause the one or more processors to perform operations comprising:

receiving, via a graphical user interface, a word prefix from a computing device of a user;

providing, to a personalized re-ranking machine learning model, a plurality of keywords to produce a plurality of predictions on the plurality of keywords, wherein:

(i) the plurality of keywords comprises one or more suggestion keywords that are associated with the word prefix, (ii) the plurality of predictions on the plurality of keywords is generated by the personalized re-ranking machine learning model based on a plurality of keyword feature vectors and one or more personalized feature vectors, (iii) the plurality of keyword feature vectors corresponds to the plurality of keywords, (iv) the one or more personalized feature vectors correspond to search session data that is associated with the user, (v) the personalized re-ranking machine learning model is stored in association with one or more inferred relevant keywords, (vi) the one or more inferred relevant keywords are determined by one or more of:

(a) matching one or more search word prefixes with one or more beginning leading characters of one or more terms searched during a same search session associated with the search session data, (b) matching the one or more search word prefixes with one or more leading characters of one or more middle words of the one or more terms searched, or (c) matching the one or more search word prefixes with one or more beginning leading characters of one or more equivalent keywords with respect to the one or more terms searched, and (vii) a plurality of rankings is assigned to the plurality of keywords based on the plurality of predictions; and providing, via the graphical user interface, the one or more suggestion keywords for the word prefix, responsive to the word prefix received from the computing device, based on the plurality of rankings.

12. The system of claim 11, wherein the operations further comprise generating the plurality of predictions based on a plurality of position embeddings associated with the one or more suggestion keywords.

13. The system of claim 11, wherein the operations further comprise:

generating training data based on the search session data;

training the personalized re-ranking machine learning model based on the training data; and generating, using the personalized re-ranking machine learning model, the plurality of predictions.

14. The system of claim 13, wherein the operations further comprise labeling one or more word prefix-suggestion pairs based on (i) occurrence of a click or a selection of one or more training typeahead suggestion keywords coinciding with one or more training word prefixes associated with the one or more word prefix-suggestion pairs, or (ii) the one or more inferred relevant keywords.

15. The system of claim 11, wherein the operations further comprise identifying the one or more equivalent keywords based on an equivalent keywords dictionary data object.

16. The system of claim 15, wherein the operations further comprise generating the equivalent keywords dictionary data object by:

generating a plurality of intersection over union measurements associated with a plurality of search results based on a comparison between the plurality of search results associated with a plurality of search queries;

determining a subset of the plurality of search queries are one or more equivalent search queries based on the plurality of intersection over union measurements and expert label data; and determining the one or more equivalent keywords based on the one or more equivalent search queries.

17. One or more non-transitory computer-readable media storing processor-executable instructions that, when executed by one or more processors, cause the one or more processors to perform operations comprising:

receiving, via a graphical user interface, a word prefix from a computing device of a user;

providing, to a personalized re-ranking machine learning model, a plurality of keywords to produce a plurality of predictions on the plurality of keywords, wherein:

(i) the plurality of keywords comprises one or more suggestion keywords that are associated with the word prefix, (ii) the plurality of predictions on the plurality of keywords is generated by the personalized re-ranking machine learning model based on a plurality of keyword feature vectors and one or more personalized feature vectors, (iii) the plurality of keyword feature vectors corresponds to the plurality of keywords, (iv) the one or more personalized feature vectors correspond to search session data that is associated with the user, (v) the personalized re-ranking machine learning model is stored in association with one or more inferred relevant keywords, (vi) the one or more inferred relevant keywords are determined by one or more of:

(a) matching one or more search word prefixes with one or more beginning leading characters of one or more terms searched during a same search session associated with the search session data, (b) matching the one or more search word prefixes with one or more leading characters of one or more middle words of the one or more terms searched, or (c) matching the one or more search word prefixes with one or more beginning leading characters of one or more equivalent keywords with respect to the one or more terms searched, and (vii) a plurality of rankings is assigned to the plurality of keywords based on the plurality of predictions; and providing, via the graphical user interface, the one or more suggestion keywords for the word prefix, responsive to the word prefix received from the computing device, based on the plurality of rankings.

18. The system of claim 11, wherein the operations further comprise generating the one or more personalized feature vectors based on the search session data, wherein:

(i) the one or more personalized feature vectors comprise one or more embeddings of one or more features that are associated with the user, and (ii) the one or more features comprise search session data, one or more word prefix embeddings, an age of the user, or a gender category corresponding to the user.

* * * * *